(12) United States Patent
Yamamoto et al.

(10) Patent No.: US 10,505,664 B2
(45) Date of Patent: Dec. 10, 2019

(54) BASE STATION, TERMINAL, RECEIVING METHOD, AND TRANSMISSION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Alexander Golitschek Edler von Elbwart, Hessen (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 75 days.

(21) Appl. No.: 15/561,492

(22) PCT Filed: Apr. 10, 2015

(86) PCT No.: PCT/CN2015/076266
§ 371 (c)(1),
(2) Date: Sep. 25, 2017

(87) PCT Pub. No.: WO2016/161619
PCT Pub. Date: Oct. 13, 2016

(65) Prior Publication Data
US 2018/0069652 A1 Mar. 8, 2018

(51) Int. Cl.
*H04L 1/00* (2006.01)
*H04L 5/00* (2006.01)
(Continued)

(52) U.S. Cl.
CPC .......... *H04L 1/0003* (2013.01); *H04L 1/0009* (2013.01); *H04L 5/0051* (2013.01);
(Continued)

(58) Field of Classification Search
CPC ..... H04L 5/0051; H04L 1/08; H04L 25/0224; H04L 1/0009; H04L 1/0003; H04W 4/70
See application file for complete search history.

(56) References Cited

U.S. PATENT DOCUMENTS

2014/0098795 A1* 4/2014 Takeda ............... H04J 13/16
370/335
2016/0100398 A1* 4/2016 Xia .................. H04W 72/0413
370/330

FOREIGN PATENT DOCUMENTS

EP 2 975 783 A1 1/2016
EP 3 236 610 A1 10/2017
(Continued)

OTHER PUBLICATIONS

3GPP TSG-RAN WG1 #80, Tdoc R1-150021, Feb 9-13, 2018, Title: "PUSCH link performance for MTC".*
(Continued)

*Primary Examiner* — Abdelillah Elmejjarmi
(74) *Attorney, Agent, or Firm* — Seed IP Law Group LLP

(57) ABSTRACT

An object of this disclosure is to improve the channel estimation accuracy without degradation of transmission quality. Control section (101) configures a predefined number of demodulation reference signals (DMRSs) for terminal (200) configured to perform repetition of an uplink signal over multiple subframes, when a coverage enhancement level corresponding to the number of the multiple subframes is smaller than a determined value, and configures, for the terminal, a number of DMRSs obtained by adding a predetermined number of DMRSs to the predefined number, when the terminal applies the repetition and the coverage enhancement level is equal to or larger than the determined value, the uplink signal being formed by time-multiplexing a data symbol with a DMRS in one subframe. Receiving section (110) receives the uplink signal including the configured
(Continued)

number of DMRSs and transmitted from the terminal. Channel estimation section (115) performs channel estimation using the DMRS included in the received uplink signal.

9 Claims, 15 Drawing Sheets

(51) Int. Cl.
  *H04W 4/70* (2018.01)
  *H04L 25/02* (2006.01)
  *H04L 1/08* (2006.01)
(52) U.S. Cl.
  CPC .......... *H04L 25/0224* (2013.01); *H04W 4/70* (2018.02); *H04L 1/08* (2013.01)

(56) References Cited

FOREIGN PATENT DOCUMENTS

| WO | 2014/142578 A1 | 9/2014 |
| WO | 2014/153777 A1 | 10/2014 |
| WO | 2015/042810 A1 | 4/2015 |

OTHER PUBLICATIONS

3GPP TS 36.211 V12.0.0, "3$^{rd}$ Generation Partnership Project; Technical Specification Group Radio Access Network; Evolved Universal Terrestrial Radio Access (E-UTRA); Physical channels and modulation (Release 12)," Dec. 2013, 120 pages.
3GPP TS 36.212 V12.0.0, "3$^{rd}$ Generation Partnership Project; Technical Specification Group Radio Access Network; Evolved Universal Terrestrial Radio Access (E-UTRA); Multiplexing and channel coding (Release 12)," Dec. 2013, 88 pages.
3GPP TS 36.213 V12.0.0, "3$^{rd}$ Generation Partnership Project; Technical Specification Group Radio Access Network; Evolved Universal Terrestrial Radio Access (E-UTRA); Physical layer procedures (Release 12)," Dec. 2013, 186 pages.
Ericsson, Nokia Networks, "New WI proposal: Further LTE Physical Layer Enhancements for MTC," RP-141660, 3GPP TSG RAN Meeting #65, Agenda Item: 14.1.1, Edinburgh, Scotland, Sep. 9-12, 2014, 8 pages.
International Search Report, dated Jan. 12, 2016, for corresponding International Application No. PCT/CN2015/076266, 2 pages.
NEC, "Uplink Reference Signal Enhancement for Low Cost MTC," R1-140417, 3GPP TSG RAN WG1 Meeting #76, Agenda Item: 7.2.2.2.4, Prague, Czech Republic, Feb. 10-14, 2014, 4 pages.
NEC, "Uplink Reference Signal Enhancement for MTC," R1-150289, 3GPP TSG RAN WG1 Meeting #80, Agenda Item: 7.2.1.2.1, Athens, Greece, Feb. 9-13, 2015, 4 pages.
NSN, Nokia, "Pusch Coverage Enhancement," R1-140552, 3GPP TSG-RAN WG1 Meeting #76, Agenda Item: 7.2.2.2.4, Prague, Czech Republic, Feb. 10-14, 2014, 2 pages.
Panasonic, "Discussion and performance evaluation PUSCH coverage enhancement," R1-150312, 3GPP TSG RAN WG1 Meeting #80, Agenda Item: 7.2.1.2.1, Athens, Greece, Feb. 9-13, 2015, 6 pages.
Extended European Search Report, dated Apr. 4, 2018, for the related European Patent Application No. 15888176.3-1220 / 3281437, 12 pages.
Ericsson, "PUSCH link performance for MTC," Tdoc R1-150021, 3GPP TSG-RAN WG1 #80, Agenda Item: 7.2.1.2.1, Athens, Greece, Feb. 9-13, 2015, 8 pages.

\* cited by examiner

BASE STATION, TERMINAL, RECEIVING METHOD, AND TRANSMISSION METHOD

TECHNICAL FIELD

This disclosure relates to a base station, a terminal, a receiving method, and a transmission method.

BACKGROUND ART

3rd Generation Partnership Project Long Term Evolution (3GPP LTE) adopts Orthogonal Frequency Division Multiple Access (OFDMA) as a downlink communication scheme from a base station (may be referred to as "eNB") to a terminal (may be referred to as "UE" (User Equipment)) and also adopts a Single Carrier-Frequency Division Multiple Access (SC-FDMA) as an uplink communication scheme from a terminal to a base station (e.g., see Non-Patent Literature (hereinafter, referred to as "NPL") 1 to NPL 3).

In LTE, base stations allocate resource blocks (RBs) in a system band to terminals for every time-unit called "subframe" to perform communication. FIG. 1 illustrates a subframe configuration example in an uplink shared channel (Physical Uplink Shared Channel: PUSCH). As illustrated in FIG. 1, one subframe consists of two time slots. In each slot, multiple SC-FDMA data symbols and a demodulation reference signal (DMRS) are time-multiplexed. Upon receiving PUSCH, the base station performs channel estimation using DMRS. The base station then demodulates and decodes the SC-FDMA data symbols using the channel estimate.

Meanwhile, Machine-to-Machine (M2M) communication has been considered a promising technique for an infrastructure to support the future information society in recent years. The M2M communication enables service using inter-device autonomous communication without involving user's judgment. "Smart grid" may be a specific application example of the M2M communication system. The smart grid is an infrastructure system that efficiently supplies a lifeline such as electricity or gas, and performs M2M communication between a smart meter provided in each home or building and a central server, and autonomously and effectively brings supply and demand for resources into balance. Other application examples of the M2M communication system include a monitoring system for goods management or remote medical care, or remote inventory or charge management of vending machines.

In M2M communication systems, use of a cellular system having a broad range of a communication area in particular is attracting attention. In 3GPP, studies on M2M to be used in such a cellular network have been carried out in LTE and LTE-Advanced standardization under the title of "Machine Type Communication (MTC)." In particular, studies on "Coverage Enhancement," which further expands the communication area, have been carried out in order to support situations where an MTC communication device such as a smart meter is installed at a location where the device cannot be used in the existing communication area, such as the basement of a building (e.g., see NPL 4).

In the MTC coverage enhancement, in particular, a technique called "repetition," which repeatedly transmits the same signal multiple times, is considered an important technique for expanding the communication area. More specifically, performing repetition transmission on PUSCH has been discussed. The base stations, which are the receiver side of PUSCH, can attempt to improve the received signal power by combining the signals transmitted by repetition transmission and thus can expand the communication area.

The repetition transmission requires a large number of time resources for transmission of the same signal and thus causes degradation of spectral efficiency. For this reason, it is desirable to reduce the number of repetitions required for achieving a required coverage enhancement, as much as possible. In this respect, studies have been carried out on techniques for reducing the number of repetitions required for achieving a required coverage enhancement on PUSCH. Examples of the techniques for reducing the number of repetitions required for achieving a required coverage enhancement include "multiple subframe channel estimation and symbol level combining" (e.g., see NPL 5).

In multiple subframe channel estimation and symbol level combining, the base station performs coherent combining on a per-symbol basis over the number of subframes ($N_{SF}$ subframes) equal to or smaller than the number of repetitions for the signals transmitted by repetition transmission over multiple subframes ($N_{Rep}$ subframes) as illustrated in FIG. 2. The base station then performs channel estimation using the DMRS after the coherent combining and demodulates and decodes SC-FDMA data symbols using the obtained channel estimate.

When the number of subframes ($N_{SF}$), which is the unit for multiple subframe channel estimation and symbol level combining, is smaller than the number of repetitions ($N_{Rep}$), the base station combines the modulated and decoded symbols ($N_{Rep}/N_{SF}$).

It has already become obvious that the use of multiple subframe channel estimation and symbol level combining can improve the transmission quality of PUSCH compared with plain repetition that performs channel estimation and demodulation and decoding of SC-FDMA data symbols on a per-subframe basis (e.g., see NPL 5). For example, in multiple subframe channel estimation and symbol level combining with four subframes ($N_{SF}=4$), Signal to Noise power Ratio (SNR) required for achieving a required Block Error Ratio (BLER) can be improved by 1.4 to 2.6 dB compared with plain repetition. In addition, in multiple subframe channel estimation and symbol level combining with eight subframes ($N_{SF}=8$), SNR required for achieving a required BLER can be improved by 1.9 to 3.5 dB compared with plain repetition.

In order to prevent degradation of channel estimation accuracy in PUSCH repetition, as illustrated in FIG. 3, increasing the number of symbols within which DMRS is inserted with respect to the existing DMRS symbols (see upper part of FIG. 3) in PUSCH has been proposed (see lower part of FIG. 3, and also see NPL 6, for example). Increasing the number of DMRS symbols results in an increase in the number of DMRSs (i.e., DMRS density) available for channel estimation and symbol level combining and thus is effective in improving the channel estimation accuracy.

CITATION LIST

Non-Patent Literature

NPL 1
3GPP TS 36.211 V12.0.0, "Evolved Universal Terrestrial Radio Access (E-UTRA); Physical channels and modulation," December 2014

NPL 2
3GPP TS 36.212 V12.0.0, "Evolved Universal Terrestrial Radio Access (E-UTRA); Multiplexing and channel coding," December 2014
NPL 3
3GPP TS 36.213 V12.0.0, "Evolved Universal Terrestrial Radio Access (E-UTRA); Physical layer procedures," December 2014
NPL 4
RP-141660, Ericsson, Nokia Networks, "New WI proposal: Further LTE Physical Layer Enhancements for MTC"
NPL 5
R1-150312, Panasonic, "Discussion and performance evaluation on PUSCH coverage enhancement"
NPL 6
R1-150289, NEC, "Uplink Reference Signal Enhancement for MTC"

SUMMARY

Increasing the number of DMRSs (or DMRS density) (hereinafter, may be referred to as "DMRS increase") reduces the number of data bits transmittable in each subframe via PUSCH. For this reason, when Modulation and Coding Scheme (MCS) is fixed, a higher coding rate has to be used for data, which causes degradation of the data transmission quality. In other words, there is a trade-off relationship between the channel estimation accuracy based on the number of DMRSs and the transmission quality based on the data coding rate.

One non-limiting and exemplary embodiment provides a base station, a terminal, a receiving method, and a transmission method capable of improving the channel estimation accuracy without degradation of transmission quality.

In one general aspect, the techniques disclosed here feature a base station comprising: a control section that configures a first number of demodulation reference signals (DMRSs) for a terminal when a coverage enhancement level is smaller than a determined value, and that configures a second number of DMRSs for the terminal when the coverage enhancement level is equal to or larger than the determined value, the terminal being configured to perform repetition of an uplink signal over a plurality of subframes, the uplink signal being formed by time-multiplexing a data symbol with a DMRS in one subframe, the coverage enhancement level corresponding to a number of the plurality of subframes, the second number being larger than the first number; a receiving section that receives the uplink signal including the DMRSs and transmitted from the terminal; and a channel estimation section that performs channel estimation using the DMRS included in the received uplink signal.

In another general aspect, the techniques disclosed here feature a terminal comprising: a control section that configures a first number of demodulation reference signals (DMRSs) for the terminal when the terminal applies repetition over a plurality of subframes to an uplink signal and a coverage enhancement level corresponding to a number of the plurality of subframes is smaller than a determined value, and that configures a second number of DMRSs for the terminal when the terminal applies the repetition and the coverage enhancement level is equal to or larger than the determined value, the uplink signal being formed by time-multiplexing a data symbol with a DMRS in one subframe, the second number being larger than the first number; and a transmission section that transmits the uplink signal including the DMRSs.

In another general aspect, the techniques disclosed here feature a receiving method comprising: configuring a first number of demodulation reference signals (DMRSs) for a terminal when a coverage enhancement level is smaller than a determined value, and configuring a second number of DMRSs for the terminal when the coverage enhancement level is equal to or larger than the determined value, the terminal being configured to perform repetition of an uplink signal over a plurality of subframes, the uplink signal being formed by time-multiplexing a data symbol with a DMRS in one subframe, the coverage enhancement level corresponding to a number of the plurality of subframes, the second number being larger than the first number; receiving the uplink signal including the DMRSs and transmitted from the terminal; and performing channel estimation using the DMRS included in the received uplink signal.

In another general aspect, the techniques disclosed here feature a transmission method comprising: configuring a first number of demodulation reference signals (DMRSs) for a terminal when the terminal applies repetition over a plurality of subframes to an uplink signal and a coverage enhancement level corresponding to a number of the plurality of subframes is smaller than a determined value, and configuring a second number of DMRSs for the terminal when the terminal applies the repetition and the coverage enhancement level is equal to or larger than the determined value, the uplink signal being formed by time-multiplexing a data symbol with a DMRS in one subframe, the second number being larger than the first number; and transmitting the uplink signal including the DMRSs.

It should be noted that, a comprehensive or specific aspect mentioned above may be implemented by a system, an apparatus, a method, an integrated circuit, a computer program or a recoding medium, or any combination of a system, an apparatus, a method, an integrated circuit, a computer program, and a recoding medium.

According to one aspect of this disclosure, the channel estimation accuracy can be improved without degradation of transmission quality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a detailed description will be given of embodiments of this disclosure with reference to the drawings.

[Point Aimed at in One Mode of this Disclosure]

In MTC coverage enhancement, defining multiple coverage enhancement levels has been discussed. For example, defining about three coverage enhancement levels including 5 dB, 10 dB, and 15 dB compared with the normal coverage (i.e., when no coverage enhancement is applied) has been discussed. Moreover, in MTC coverage enhancement, studies have been carried out on a configuration in which, when a terminal having low maximum transmission power compared with the normal terminal is defined, the coverage enhancement level for the terminal is set to 6 dB, 12 dB, and 18 dB compared with the normal coverage.

Hereinafter, the coverage enhancement level that requires a coverage enhancement of 5 dB or 6 dB may be referred to as "small coverage enhancement level," the coverage enhancement level that requires a coverage enhancement of 10 dB or 12 dB may be referred to as "middle coverage enhancement level," and the coverage enhancement level that requires a coverage enhancement of 15 dB or 18 dB may be referred to as "large coverage enhancement level." Note that, the levels required for the enhancement levels mentioned above are by no means limited to 5 dB, 6 dB, 10 dB, 12 dB, 15 dB, or 18 dB.

In general, in order to achieve a larger coverage enhancement level, a larger number of repetitions is required. For example, the number of repetitions required for achieving coverage enhancements of 15 dB and 18 dB are approximately 64 and 128 subframes.

In the case of repetitions over 64 or 128 subframes, however, the phases of received signals do not match due to the influence of frequency offset, causing performance degradation when multiple subframe channel estimation and symbol level combining are performed using the number of subframes identical to the number of repetitions in the base stations. For this reason, it can be said that the number of subframes ($N_{SF}$) useable with multiple subframe channel estimation and symbol level combining is limited to around four or eight subframes.

Accordingly, even when an extremely large number of repetitions over 64 or 128 subframes, for example, is required, the base station performs multiple subframe channel estimation and symbol level combining for approximately four or eight subframes. However, performing multiple subframe channel estimation and symbol level combining with a small number of subframes such as four or eight subframes when an extremely large number of repetitions (64 or 128 repetitions) is required results in degradation of the channel estimation accuracy because the signal to interference power ratio (SIR) or SNR of DMRS after coherent combining becomes extremely small.

Figure 4A:
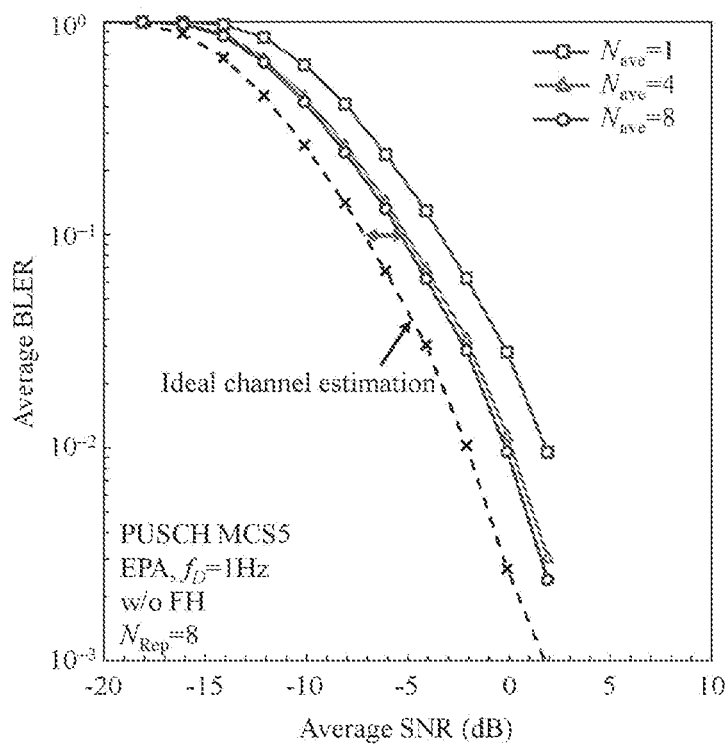
FIG. 4A is a diagram illustrating the BLER performance when the number of repetitions $N_{Rep}=8$.
Figure 4B:
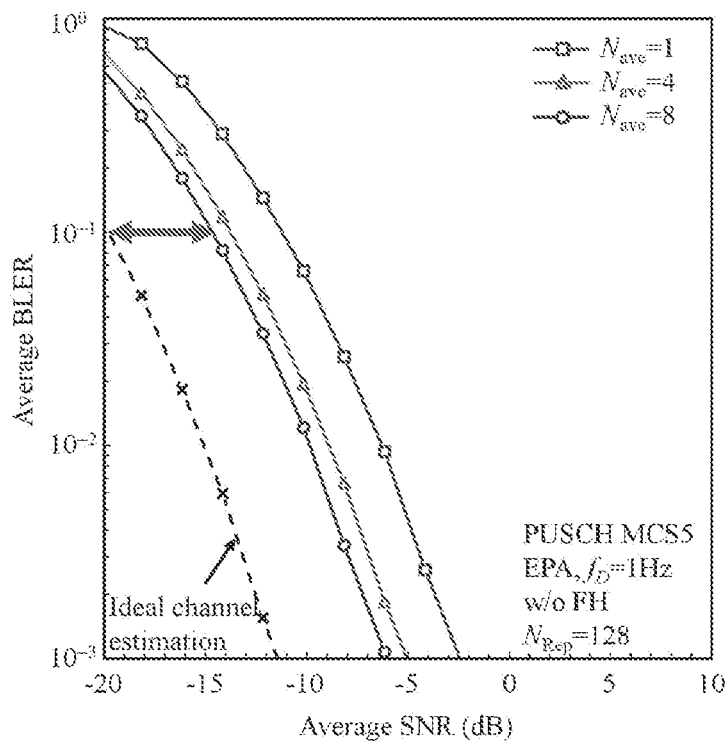
FIG. 4B is a diagram illustrating the BLER performance when the number of repetitions $N_{Rep}=128$.

FIGS. 4A and 4B each illustrate the BLER performance of PUSCH repetition using multiple subframe channel estimation and symbol level combining. FIG. 4A indicates the BLER performance of eight repetitions while FIG. 4B indicates the BLER performance of 128 repetitions. In addition, FIGS. 4A and 4B each indicate the BLER performance with ideal channel estimation for the purpose of comparison.

As indicated in FIGS. 4A and 4B, when the number of repetitions is eight, which is a relatively small number of repetitions, the amount of degradation from the ideal channel estimation can be kept around 2 dB by multiple subframe channel estimation and symbol level combining. Meanwhile, it can be observed that, when the number of repetitions is 128, which is a relatively large number of repetitions, channel estimation and symbol level combining with four or eight subframes results in a degradation of 5 dB from the ideal channel estimation, which is larger than the amount of degradation in eight repetitions.

As described above, performing multiple subframe channel estimation and symbol level combining when the number of repetitions is relatively large results in performance degradation compared with the ideal channel estimation.

Next, a case where the number of symbols within which DMRSs are inserted is increased with respect to the existing number of DMRS symbols (upper part of FIG. 3) in PUSCH will be discussed.

Figure 3:
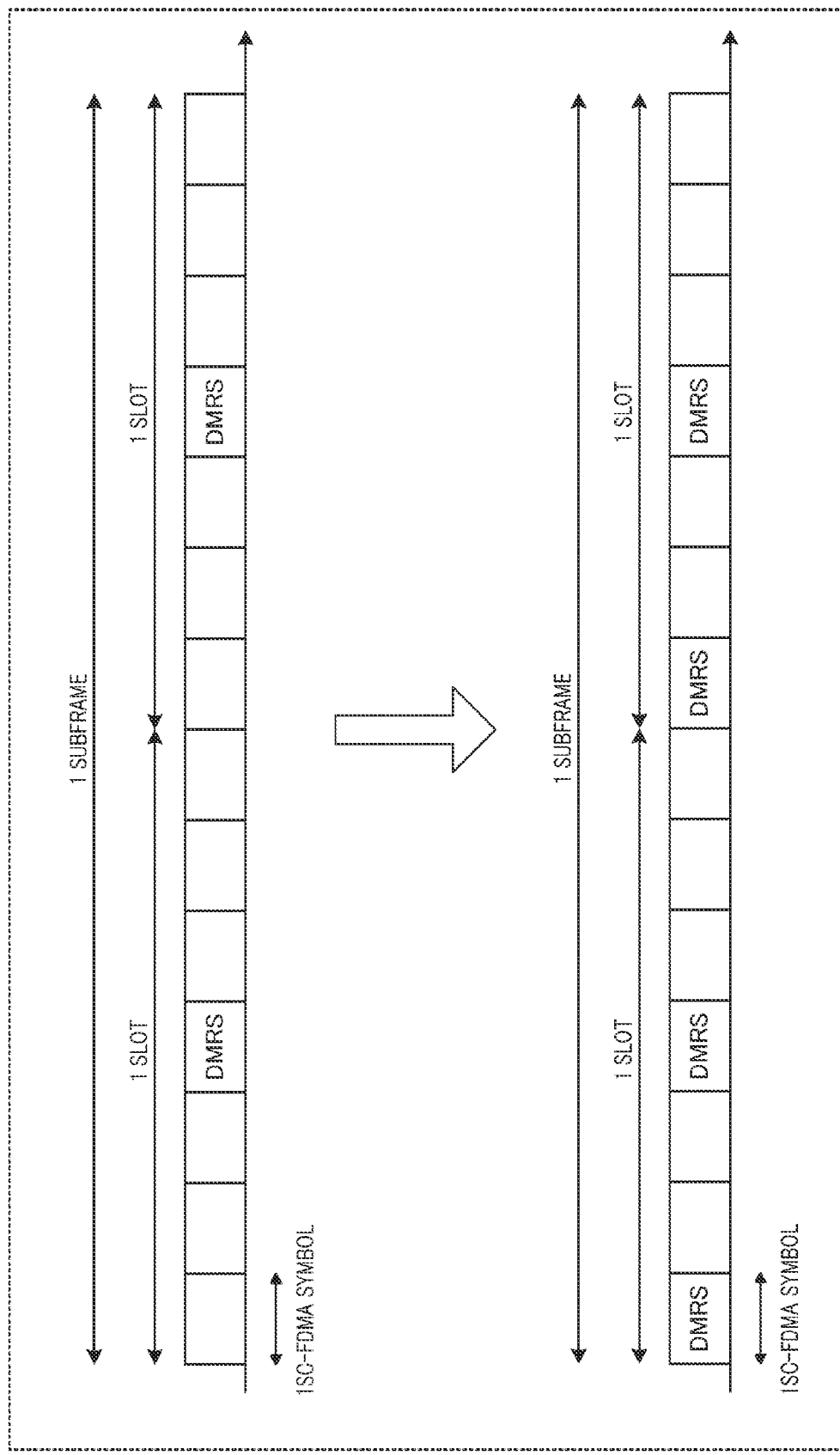
FIG. 3 is a diagram illustrating an example of DMRS mapping (upper part of the drawing), as well as an example of DMRS mapping when the number of DMRSs is increased (lower part of the drawing)
Figure 5:
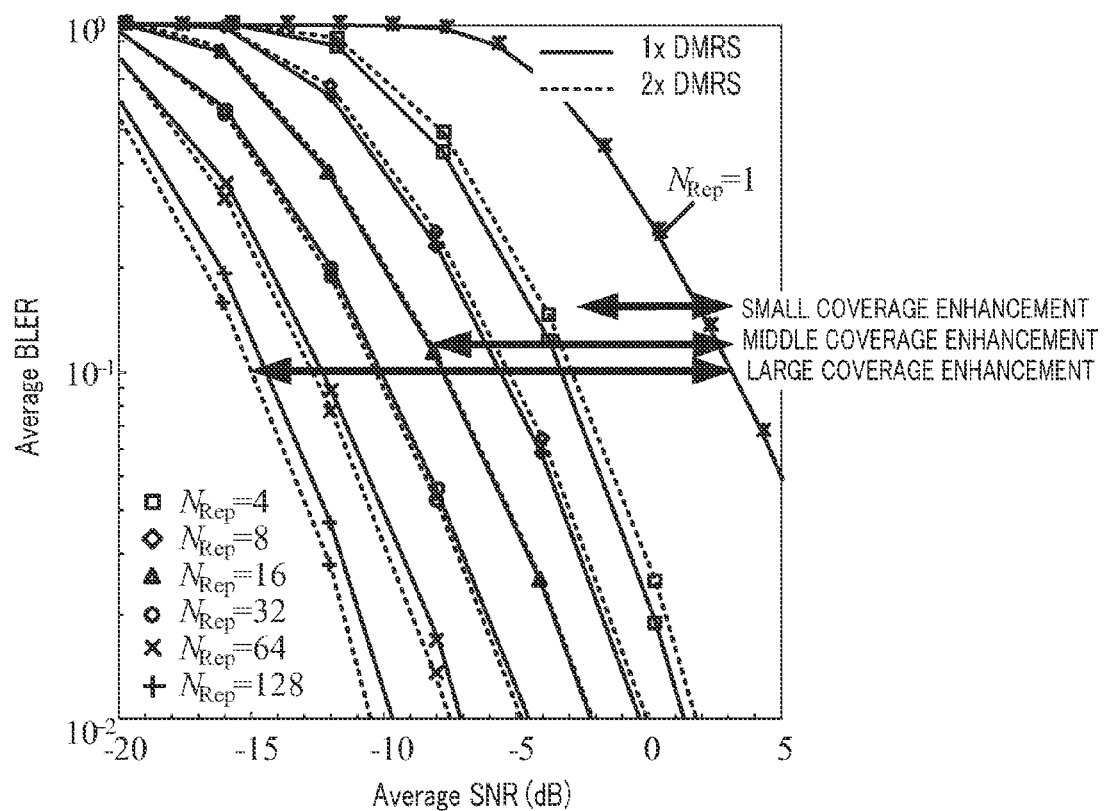
FIG. 5 is a diagram illustrating the BLER performance when the number of DMRSs is increased.

FIG. 5 illustrates the BLER performance of the case where one DMRS is mapped in one slot as illustrated in the upper part of FIG. 3 (i.e., case where the number of DMRSs is not increased; 1×DMRS) and of the case where two DMRSs are mapped in one slot as illustrated in the lower part of FIG. 3 (i.e., case where the number of DMRSs is doubled; 2×DMRS) for the numbers of repetitions $N_{Rep}$=4, 8, 16, 32, 64, and 128. In addition, FIG. 5 indicates the BLER performance of a case where the number of repetitions $N_{Rep}$=1 (no repetitions) and one DMRS is mapped in one slot as in the upper part of FIG. 3 (i.e., case corresponding to the normal coverage) for the purpose of comparison. Moreover, FIG. 5 indicates the BLER performance of a case where channel estimation and symbol level combining over four subframes ($N_{SF}$=4) are used.

As indicated in FIG. 5, the small coverage enhancement level, which requires a coverage enhancement of 5 dB or 6 dB, requires approximately 4 repetitions ($N_{Rep}$=4). Moreover, the middle coverage enhancement level, which requires a coverage enhancement of 10 dB or 12 dB, requires approximately 16 repetitions ($N_{Rep}$=16). Furthermore, the large coverage enhancement level, which requires a coverage enhancement of 15 dB or 18 dB, requires approximately 128 repetitions ($N_{Rep}$=128).

Meanwhile, as indicated in FIG. 5, it can be observed that, when the number of DMRSs is doubled, the BLER performance are the same or degrade with 4, 8, or 16 repetitions ($N_{Rep}$=4, 8, 16) required for the small or middle coverage enhancement level, as compared with the case where the number of DMRSs is not increased. Meanwhile, it can be observed that, when the number of DMRSs is doubled, the BLER performance are improved with 64 or 128 repetitions ($N_{Rep}$=64, 128) required for the large coverage enhancement level as compared with the case where the number of DMRSs is not increased.

As described above, it can be observed that increasing the number of DMRSs is effective when the number of repetitions is relatively large ($N_{Rep}$=64 or larger in FIG. 5).

As described above, with the small or middle coverage enhancement level, which involves a relatively small number of repetitions, performance improvement of PUSCH by multiple subframe channel estimation and symbol level combining can be obtained as indicated in FIG. 4A, but no performance improvement of PUSCH by the DMRS increase is obtained as indicated in FIG. 5.

Meanwhile, in the large coverage enhancement level, which involves a relatively large number of repetitions, although the performance improvement of PUSCH by multiple subframe channel estimation and symbol level combining is not sufficient as indicated in FIG. 4B, the performance improvement of PUSCH by the DMRS increase is obtained as indicated in FIG. 5.

In this respect, in one mode of this disclosure, a larger number of DMRSs is configured for a terminal with the large coverage enhancement level than the number of DMRSs for the normal terminal (i.e., predefined number of DMRSs) among terminals configured with the MTC coverage enhancement mode. Meanwhile, the same number of DMRSs as the number of DMRSs for the normal terminal is configured for a terminal with the middle or small coverage enhancement level (i.e., the number of DMRSs is not increased).

Thus, when multiple subframe channel estimation and symbol level combining are performed, the PUSCH transmission performance can be improved in the small or middle coverage enhancement level without any increase in the number of DMRSs. In addition, the DMRS increase can improve the PUSCH transmission performance in the large coverage enhancement level.

Moreover, the DMRS increase is applied only to the large coverage enhancement level where a performance improvement can be expected, and the DMRS increase is not applied to the small or middle coverage enhancement level. Thus, there is no reduction in the number of data bits transmittable via PUSCH in the small or middle coverage enhancement level.

[Overview of Communication System]

A communication system according to each embodiment of this disclosure is an LTE-Advanced compliant system, for example, and includes base station 100 and terminal 200.

Let us suppose a situation where MTC coverage enhancement mode terminal 200 exists in a cell provided by base station 100. When the MTC coverage enhancement mode is applied, for example, terminal 200 applies repetition transmission over multiple subframes during PUSCH transmission. In other words, terminal 200 repeatedly transmits the same signal over consecutive subframes for a predetermined number of repetitions (may be referred to as "repetition level" or "repetition factor").

When $N_{Rep}$ repetitions (i.e., the number of repetitions: $N_{Rep}$) are performed, terminal 200 consecutively transmits one subframe signal over $N_{Rep}$ subframes.

Figure 1:
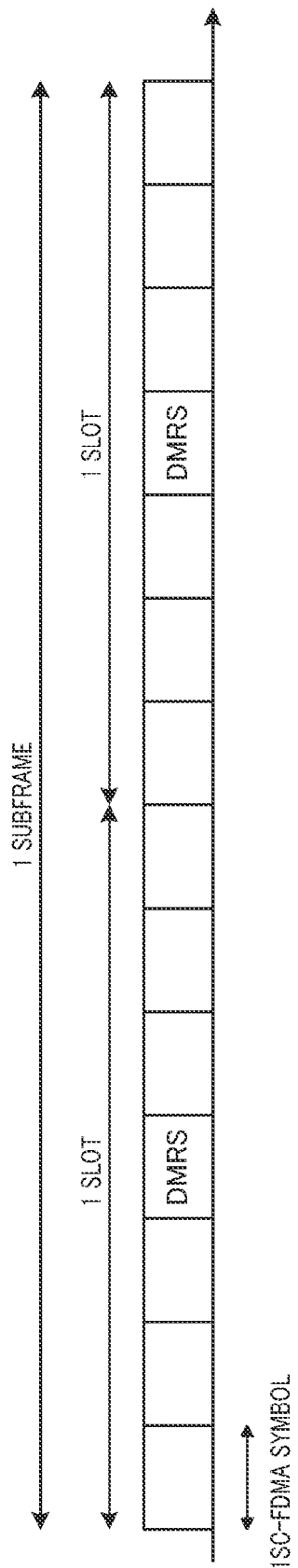
FIG. 1 is a diagram illustrating an example of a PUSCH subframe configuration.
Figure 2:
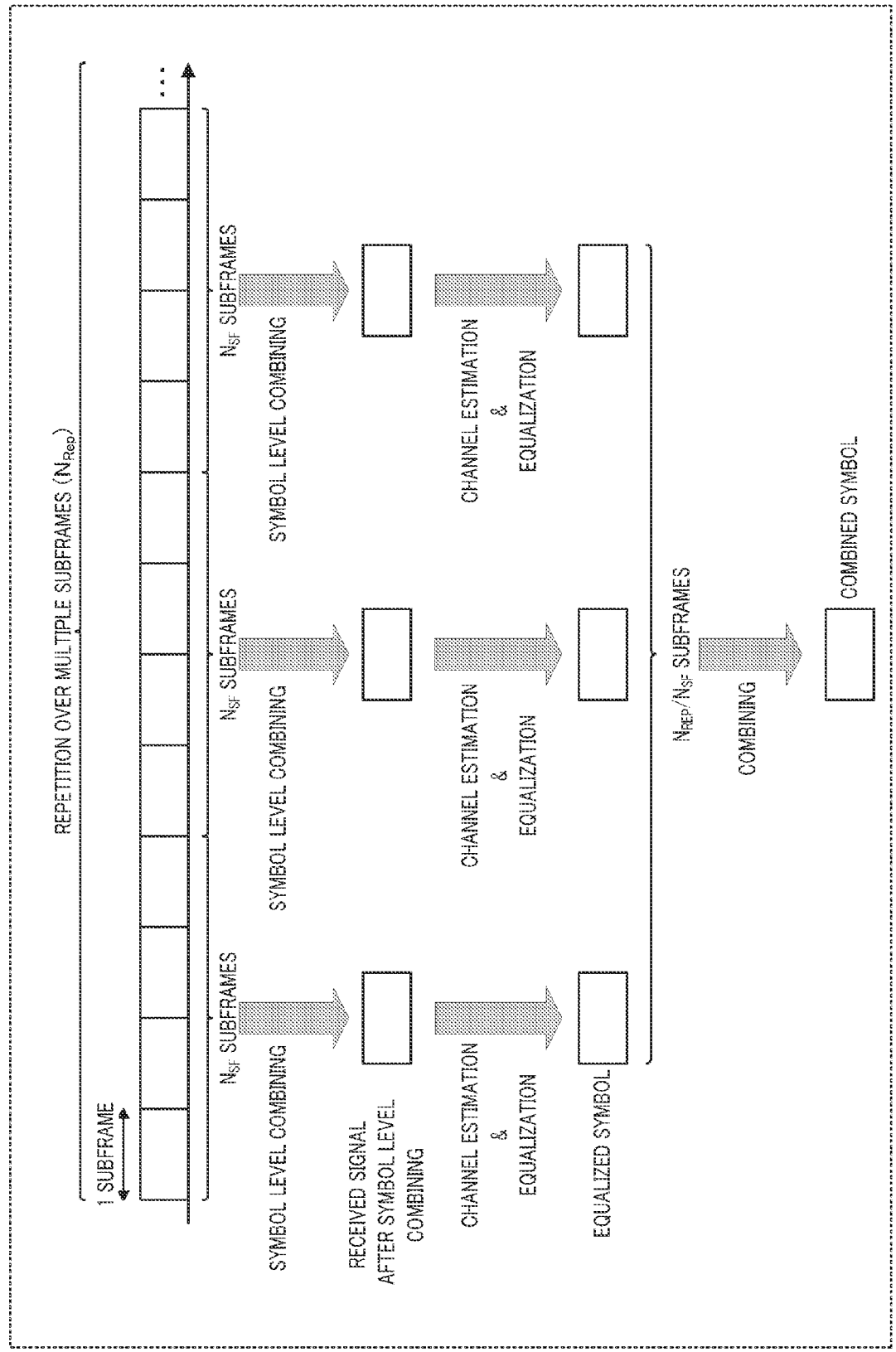
FIG. 2 is a diagram illustrating an operation example of multiple subframe channel estimation and symbol level combining.

Meanwhile, base station 100 performs "multiple subframe channel estimation and symbol level combining" for the signal transmitted by repetition transmission from terminal 200 (e.g., see FIG. 2). More specifically, base station 100 performs coherent combining, on a per-symbol basis, over the number of subframes ($N_{SF}$ subframes) equal to or smaller than the number of repetitions $N_{Rep}$. Base station 100 then performs channel estimation using the coherently combined DMRS and demodulates and decodes the SC-FDMA data symbols using the obtained channel estimate.

Figure 6:
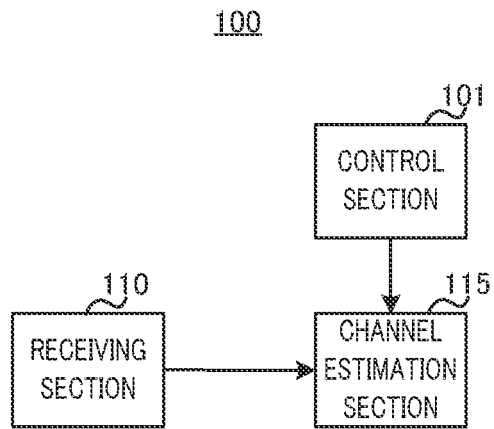
FIG. 6 is a block diagram illustrating a primary configuration of a base station according to Embodiment 1.

FIG. 6 is a block diagram illustrating a primary configuration of base station 100 according to an embodiment of this disclosure. In base station 100 illustrated in FIG. 6, control section 101 configures a first number of DMRSs for terminal 200 configured to perform repetition of an uplink signal over multiple subframes, when the coverage enhancement level corresponding to the number of multiple subframes is smaller than a determined value. The uplink signal transmitted by repetition is obtained by time-multiplexing a data symbol with a demodulation reference signal (DMRS) in one subframe. Meanwhile, control section 101 configures a second number of DMRSs to the predefined number of DMRSs for terminal 200 configured in the same manner, when the coverage enhancement level is equal to or larger than the determined value, the second number being larger than the first number. Receiving section 110 receives an uplink signal including the DMRSs that is transmitted from terminal 200. Channel estimation section 115 performs channel estimation using the DMRSs included in the received uplink signal.

Figure 7:
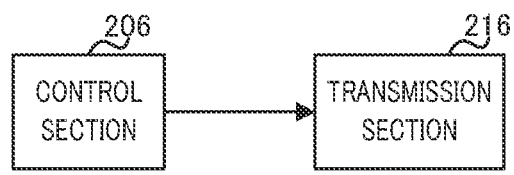
FIG. 7 is a block diagram illustrating a primary configuration of a terminal according to Embodiment 1.

Meanwhile, FIG. 7 is a block diagram illustrating a primary configuration of terminal 200 according to each embodiment of this disclosure. In terminal 200 illustrated in FIG. 7, when applying repetition for an uplink signal obtained by time-multiplexing a data symbol with a demodulation reference signal (DMRS) in one subframe, over multiple subframes, control section 206 configures a first number of DMRSs for terminal 200 of control section 206 when the coverage enhancement level corresponding to the number of multiple subframes is smaller than a determined value. Meanwhile, control section 206 configures a second number of DMRSs for terminal 200 of control section 206, when the coverage enhancement level is equal to or larger than the determined value, the second number being larger than the first number. Transmission section 216 transmits an uplink signal including the DMRSs.

Embodiment 1

[Configuration of Base Station]

Figure 8:
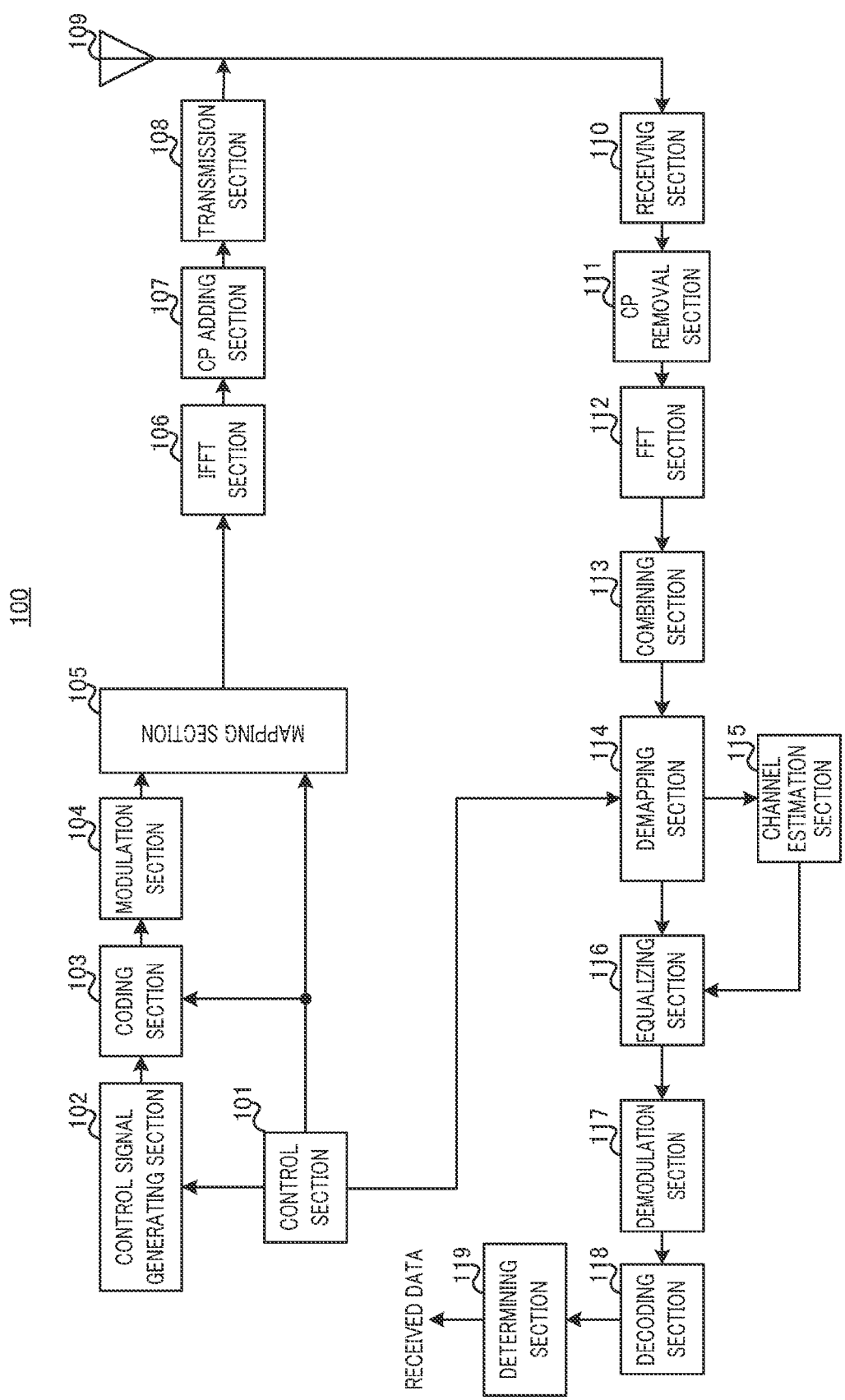
FIG. 8 is a block diagram illustrating a configuration of the base station according to Embodiment 1.

FIG. 8 is a block diagram illustrating a configuration of base station 100 according to Embodiment 1 of this disclosure. In FIG. 8, base station 100 includes control section 101, control signal generating section 102, coding section 103, modulation section 104, a mapping section 105, inverse fast Fourier transform (IFFT) section 106, cyclic prefix (CP) adding section 107, transmission section 108, antenna 109, receiving section 110, CP removal section 111, fast Fourier transform (FFT) section 112, combining section 113, demapping section 114, channel estimation section 115, equalizing section 116, demodulation section 117, decoding section 118, and determining section 119.

Control section 101 determines PUSCH assignment for resource allocation target terminal 200. Control section 101, for example, determines a frequency allocation resource and a modulation and coding scheme for terminal 200 and outputs information on the determined parameters to control signal generating section 102.

Moreover, control section 101 determines a coding level for the control signal and outputs the determined coding level to coding section 103. Moreover, control section 101 determines a radio resource to which the control signal is mapped (downlink resource) and outputs information on the determined radio resource to mapping section 105.

Control section 101 determines a coverage enhancement level of terminal 200 and outputs information on the determined coverage enhancement level or the number of repetitions required for PUSCH transmission in the determined coverage enhancement level to control signal generating section 102. In addition, control section 101 generates information on the number of DMRSs or DMRS mapping used in PUSCH repetition performed by terminal 200, based on information on the coverage enhancement level or the number of repetitions required for PUSCH transmission, and outputs the generated information to demapping section 114.

Control signal generating section 102 generates a control signal for terminal 200. The control signal includes a downlink control indicator (DCI) for uplink grant for indicating information on PUSCH assignment received from control section 101. The DCI for uplink grant consists of multiple bits and includes information indicating a frequency allocation resource, a modulation and coding scheme, and/or the like.

In addition, when the information on the coverage enhancement level or the number of repetitions required for PUSCH transmission is transmitted via a downlink control channel for MTC, the information mentioned herein is also included in the DCI for uplink grant. Note that, the information on the coverage enhancement level or the number of repetitions required for PUSCH transmission may be indicated to control section 206 of terminal 200 via higher-layer signaling.

Control signal generating section 102 generates a control information bit sequence (control signal) using information received from control section 101 and outputs the generated control signal to coding section 103. Note that, there is a situation where a control signal is transmitted to multiple terminals 200, so that control signal generating section 102 includes the terminal ID of each terminal 200 in the control signal for terminal 200 and generates a bit sequence. For example, a cyclic redundancy check (CRC) bit masked with the terminal ID of the destination terminal is added to the control signal.

Coding section 103 encodes the control signal (coded bit sequence) received from control signal generating section 102 in accordance with the coding level indicated by control section 101 and outputs the coded control signal to modulation section 104.

Modulation section 104 modulates the control signal received from coding section 103 and outputs the modulated control signal (symbol sequence) to mapping section 105.

Mapping section 105 maps the control signal received from modulation section 104 to a radio resource indicated by control section 101. Note that, the control channel to which the control signal is mapped may be an MTC PDCCH or Enhanced PDCCH (EPDCCH). Mapping section 105 outputs, to IFFT section 106, a signal in the downlink subframe including the MTC PDCCH or EPDCCH to which the control signal is mapped.

IFFT section 106 applies IFFT processing to the signal received from mapping section 105, thereby transforming a frequency-domain signal into a time-domain signal. IFFT section 106 outputs the time-domain signal to CP adding section 107.

CP adding section 107 adds a CP to the signal received from IFFT section 106 and outputs the CP added signal (OFDM signal) to transmission section 108.

Transmission section 108 applies radio frequency (RF) processing such as digital-to-analog (D/A) conversion or up-conversion to the OFDM signal received from CP adding section 107 and transmits the processed radio signal to terminal 200 via antenna 109.

Receiving section 110 applies RF processing such as down conversion or analog-to-digital (A/D) conversion to the uplink signal (PUSCH) received from terminal 200 via antenna 109 and outputs the received signal thus obtained to CP removal section 111. The uplink signal (PUSCH) transmitted from terminal 200 includes a signal that has been subjected to repetition processing over multiple subframes.

CP removal section 111 removes the CP added to the received signal received from receiving section 110 and outputs the signal after CP removal to FFT section 112.

FFT section 112 applies FFT processing to the signal received from CP removal section 111 to transform the signal into a frequency-domain signal sequence and extract a signal corresponding to a PUSCH subframe and outputs the extracted signal to combining section 113.

Combining section 113 coherently combines a data signal and a signal portion corresponding to DMRS using symbol level combining for PUSCH transmitted by repetition over multiple subframes. Combining section 113 outputs the combined signal to demapping section 114.

Demapping section 114 extracts a PUSCH subframe portion assigned to terminal 200 from the signal received from combining section 113, using information on the number of DMRSs and DMRS mapping that is received from control section 101 and used in PUSCH repetition by terminal 200. In addition, demapping section 114 separates the extracted PUSCH subframe portion for terminal 200 into DMRS and a data symbol (SC-FDMA data symbol) and outputs the DMRS and data symbol to channel estimating section 115 and equalizing section 116, respectively.

Channel estimation section 115 performs channel estimation using DMRS received from demapping section 114. Channel estimation section 115 outputs the obtained channel estimate to equalizing section 116.

Equalizing section 116 equalizes the data symbol received from demapping section 114, using the channel estimate received from channel estimation section 115. Equalizing section 116 outputs the equalized data symbol to demodulation section 117.

Demodulation section 117 applies inverse discrete Fourier transform (IDFT) processing to the frequency-domain SC-FDMA data symbol received from equalizing section 116 to transform the symbol into a time-domain signal and then performs data modulation. More specifically, demodulation section 117 converts a symbol sequence into a bit sequence based on the modulation scheme indicated to terminal 200 and outputs the bit sequence thus obtained to decoding section 118.

Decoding section 118 performs error correction decoding on the bit sequence received from demodulation section 117 and outputs the decoded bit sequence to determining section 119.

Determining section 119 performs error detection on the bit sequence received from decoding section 118. The error detection is performed using a CRC bit added to the bit sequence. Determining section 119 extracts the received data and outputs an ACK when the detection result of the CRC bit indicates no error. Meanwhile, determining section 119 outputs a NACK when the detection result of the CRC bit indicates error. Such an ACK or NACK to be outputted from determining section 119 is used in retransmission control processing in a processing section (not illustrated).

[Configuration of Terminal]

Figure 9:
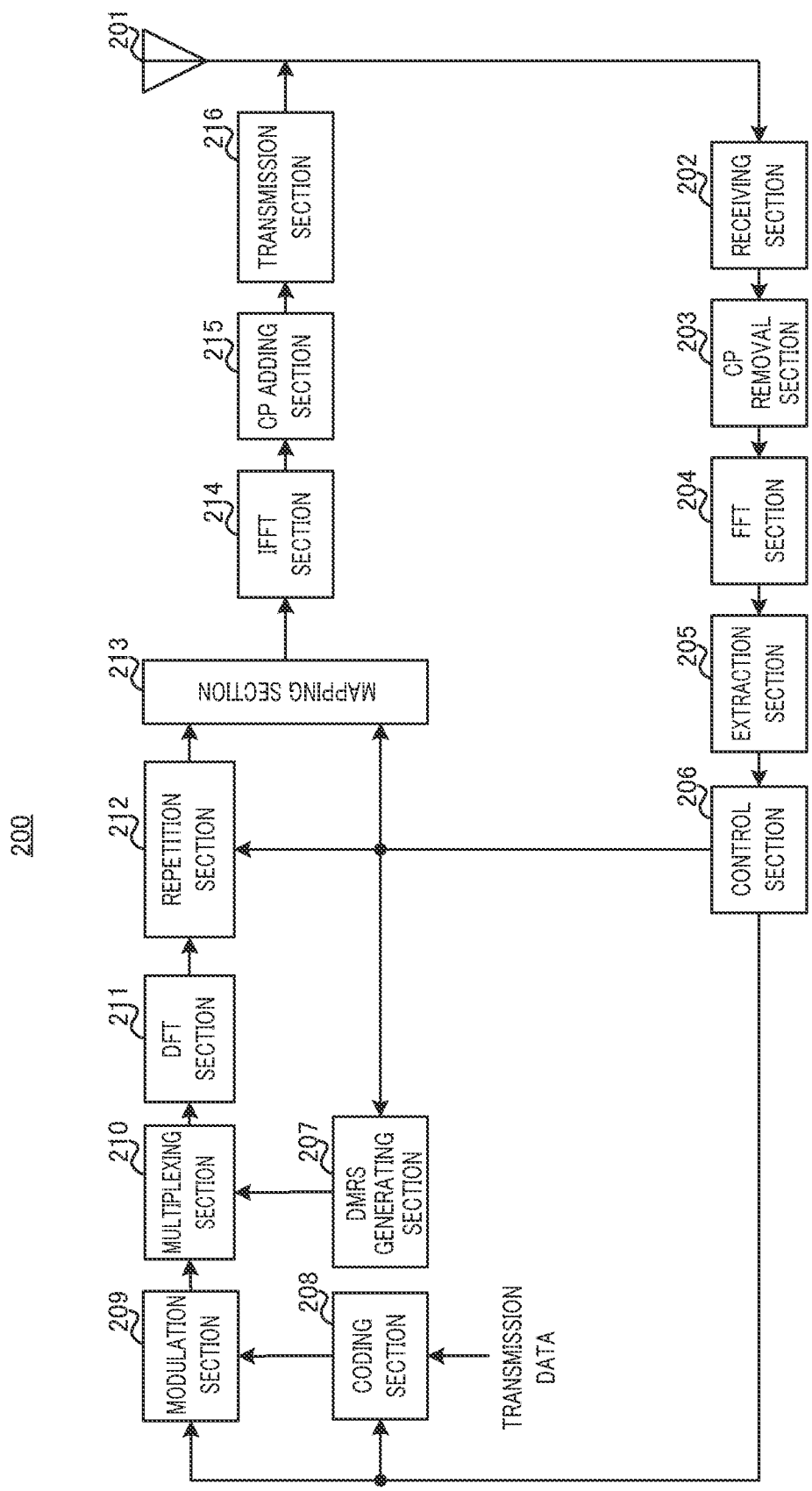
FIG. 9 is a block diagram illustrating a configuration of the terminal according to Embodiment 1.

FIG. 9 is a block diagram illustrating a configuration of terminal 200 according to Embodiment 1 of this disclosure. In FIG. 9, terminal 200 includes antenna 201, receiving section 202, CP removal section 203, FFT section 204, extraction section 205, control section 206, DMRS generating section 207, coding section 208, modulation section 209, multiplexing section 210, DFT section 211, repetition section 212, mapping section 213, IFFT section 214, CP adding section 215, and transmission section 216.

Receiving section 202 applies RF processing such as down-conversion or A/D conversion to the radio signal (MTC PDCCH or EPDCCH) received from base station 100 via antenna 201 and obtains a baseband OFDM signal. Receiving section 202 outputs the OFDM signal to CP removal section 203.

CP removal section 203 removes the CP added to the OFDM signal received from receiving section 202 and outputs the signal after CP removal to FFT section 204.

FFT section 204 applies FFT processing to the signal received from CP removal section 203, thereby transforming the time-domain signal into a frequency-domain signal. FFT section 204 outputs the frequency-domain signal to extraction section 205.

Extraction section 205 performs blind-decoding on the frequency-domain signal (MTC PDCCH or EPDCCH) received from FFT section 204 and attempts to decode the control signal intended for terminal 200 of extraction section 205. The CRC masked with the terminal ID of the terminal is added to the control signal intended for terminal 200. Accordingly, extraction section 205 extracts the control information if CRC detection is OK as a result of blind-decoding and outputs the extracted control information to control section 206.

Control section 206 controls PUSCH transmission based on the control signal received from extraction section 205. More specifically, control section 206 indicates the resource allocation for PUSCH transmission to mapping section 213 based on the PUSCH resource allocation information included in the control signal. Moreover, control section 206 indicates the coding and modulation schemes for PUSCH transmission respectively to coding section 208 and modulation section 209 based on the coding and modulation scheme included in the control signal.

Moreover, when information on the coverage enhancement level or information on the number of repetitions required for PUSCH transmission is included in the control signal, control section 206 determines the number of repetitions for PUSCH repetition transmission and whether or not to increase the number of DMRSs, based on the information, and indicates the information indicating the determined number of repetitions and the information indicating whether or not to increase the number of DMRSs to repetition section 212 and DMRS generating section 207, respectively.

Moreover, when the information on the coverage enhancement level or the information on the number of repetitions required for PUSCH transmission is indicated by base station 100 via higher-layer signaling, control section 206 determines the number of repetitions for PUSCH repetition transmission and whether or not to increase the number of DMRSs based on the indicated information and indicates the determined pieces of information to repetition section 212 and DMRS generating section 207, respectively. Moreover, control section 206 may indicate the information on the number of DMRSs to be increased or the positions of DMRSs indicated by base station 100 via higher-layer signaling to DMRS generating section 207.

DMRS generating section 207 generates DMRSs in accordance with the determination whether or not to increase the number of DMRSs, the number of DMRSs to be increased, the positions of DMRSs, and the DMRS pattern that are indicated by control section 206 and outputs the generated DMRSs to multiplexing section 210.

Coding section 208 adds a CRC bit masked with the terminal ID of terminal 200 to the transmission data to be received (uplink data), performs error correction coding on the data, and outputs the coded bit sequence to modulation section 209.

Modulation section 209 modulates the bit sequence received from coding section 208 and outputs the modulated signal (data symbol sequence) to multiplexing section 210.

Multiplexing section 210 time-multiplexes the data symbol sequence received from modulation section 209 with the DMRSs received from DMRS generating section 207 and outputs the multiplexed signal to DFT section 211.

DFT section 211 applies DFT to the signal received from multiplexing section 210 to generate a frequency-domain signal and outputs the generated frequency-domain signal to repetition section 212.

When terminal 200 of repetition section 212 is in the MTC coverage enhancement mode, repetition section 212 performs repetition for the signal received from DFT section 211 over multiple subframes based on the number of repetitions indicated by control section 206 and generates a repetition signal. Repetition section 212 outputs the repetition signal to mapping section 213.

Mapping section 213 maps the signal received from repetition section 212 to a PUSCH time and frequency resource indicated by control section 206. Mapping section 213 outputs the PUSCH signal to which the signal is mapped to IFFT section 214.

IFFT section 214 generates a time-domain signal by applying IFFT processing to the frequency-domain PUSCH signal received from mapping section 213. IFFT section 214 outputs the generated signal to CP adding section 215.

CP adding section 215 adds a CP to the time-domain signal received from IFFT section 214 and outputs the CP added signal to transmission section 216.

Transmission section 216 applies RF processing such as D/A conversion or up-conversion to the signal received from CP adding section 215 and transmits the radio signal to base station 100 via antenna 201.

[Operations of Base Station 100 and Terminal 200]

Hereinafter, a detailed description will be given of base station 100 and terminal 200 configured in the manner described above.

Base station 100 indicates the coverage enhancement level (large, middle, small, or no coverage enhancement) or the number of repetitions ($N_{Rep}$) to terminal 200 before PUSCH transmission and reception.

For example, the large coverage enhancement level (15 dB, 18 dB) and the number of repetitions ($N_{Rep}$)=128 may be associated with each other, while the middle coverage enhancement level (10 dB, 12 dB) and the number of repetitions ($N_{Rep}$)=16 may be associated with each other, and the small coverage enhancement level (5 dB, 6 dB) and the number of repetitions ($N_{Rep}$)=4 may be associated with each other.

The coverage enhancement level (large, middle, small, or no coverage enhancement) or the number of repetitions ($N_{Rep}$) may be indicated to terminal 200 by base station 100 via a higher layer (RRC signaling) or using a downlink control channel for MTC. In addition, the number of repetitions can be found from the coding rate configured in terminal 200, so that base station 100 may indicate the MCS to terminal 200, thus, implicitly indicating the number of repetitions without explicit indication.

[Method of Determining DMRS Addition]

Base station 100 (control section 101) does not increase the number of DMRSs used in PUSCH repetition performed by terminal 200, when terminal 200 is configured with the coverage enhancement mode and also configured with the middle or small coverage enhancement level. Meanwhile, terminal 200 (control section 206) does not increase the number of DMRSs mapped to PUSCH, when the coverage enhancement level or the number of repetitions ($N_{Rep}$) indicated by base station 100 is the middle or small coverage enhancement level or the number of repetitions corresponding to any one of these levels (e.g., 16 times or 8 times).

More specifically, when the coverage enhancement mode (repetition transmission) is applied to terminal 200 and the coverage enhancement level is smaller than a determined value (e.g., 15 dB or 18 dB), base station 100 and terminal 200 configure the number of DMRSs configured for the normal terminal (predefined number of DMRSs).

Figure 10B:
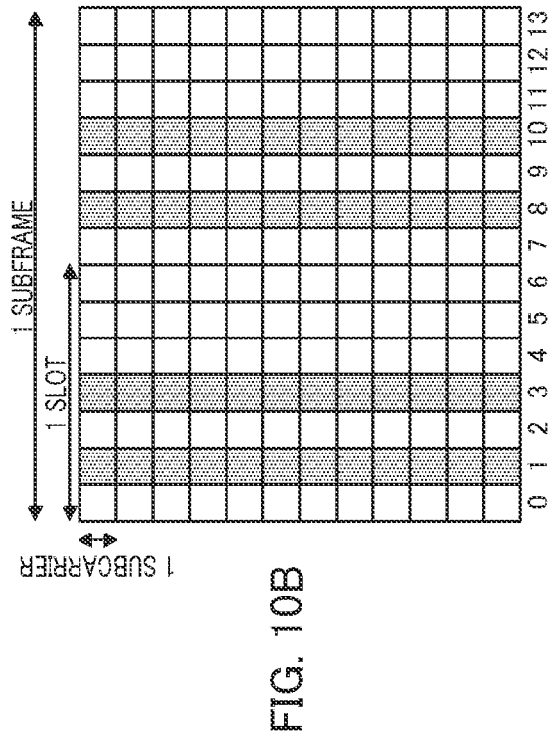
FIG. 10B is a diagram illustrating an example of DMRS mapping when the number of DMRSs is increased in Embodiment 1.
Figure 10C:
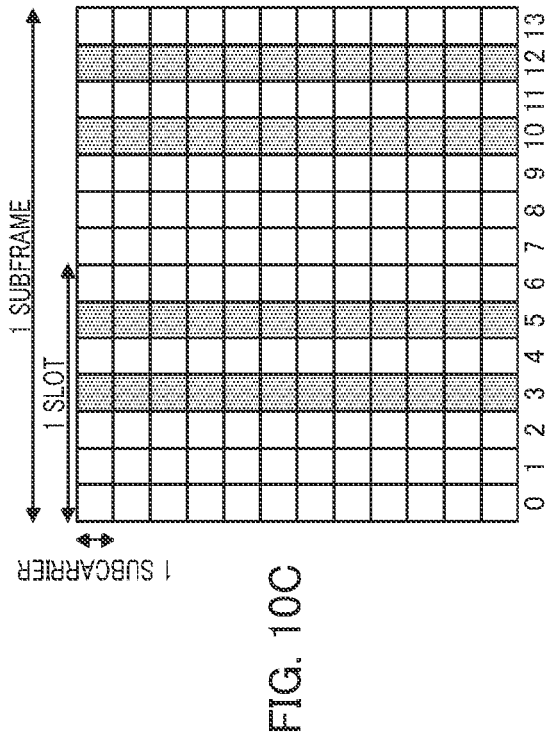
FIG. 10C is a diagram illustrating an example of DMRS mapping when the number of DMRSs is increased in Embodiment 1.
Figure 10A:
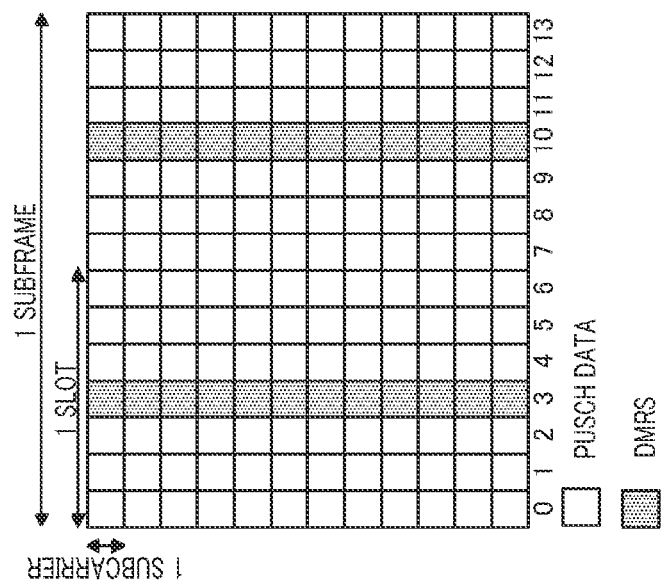
FIG. 10A is a diagram illustrating an example of the existing DMRS mapping.

In this case, as illustrated in FIG. 10A, DMRS is mapped to one symbol of each slot (third and tenth SC-FDMA symbols) in one subframe, for example.

Meanwhile, base station 100 (control section 101) increases the number of DMRSs used in PUSCH repetition performed by terminal 200, for terminal 200 configured with the coverage enhancement mode and also configured with the large coverage enhancement level. Moreover, terminal 200 (control section 206) increases the number of DMRSs to be mapped to PUSCH, when the coverage enhancement level or the number of repetitions ($N_{Rep}$) indicated by base station 100 is the large coverage enhancement level or the number of repetitions corresponding to this level (e.g., 128 times).

In other words, when the coverage enhancement mode (repetition transmission) is applied to terminal 200 and the coverage enhancement level is equal to or larger than a determined value (e.g., 15 dB or 18 dB), base station 100 and terminal 200 configure the number of DMRSs obtained by adding a predetermined number of DMRSs to the number of DMRSs configured for the normal terminal (i.e., predefined number of DMRSs).

In Embodiment 1, the DMRS to be added is mapped on a per-symbol basis in one subframe.

In FIG. 10B or 10C, for example, in addition to the existing DMRS mapped to one symbol of each slot (third and tenth SC-FDMA symbols) in one subframe, DMRSs are added to the first and eighth SC-FDMA symbols or the fifth and twelfth SC-FDMA symbols. In other words, twice the existing number of DMRSs is mapped in FIGS. 10B and 10C compared with FIG. 10A.

Note that, it is also possible to add a DMRS only to one symbol in one subframe (i.e., to add a DMRS only in any one of slots) (increased one and half times the existing number of DMRSs) when the number of DMRSs is increased. For example, in addition to the third and tenth SC-FDMA symbols, a DMRS symbol may be mapped to any one of the first, fifth, eighth, and twelfth SC-FDMA symbols illustrated in FIG. 10B or 10C.

The granularity of DMRS increase by adding a DMRS on a per-symbol basis is 7% ($\approx$1/14). In other words, the overhead for DMRS increases by 7% when a DMRS is added to one symbol in one subframe. Accordingly, when the number of DMRSs is doubled (i.e., added to two symbols) as illustrated in FIGS. 10B and 10C, the overhead for DMRS increases by 14%.

Adding DMRS on a per-symbol basis as in Embodiment 1 brings the advantage of keeping peak to average power ratio (PAPR) low.

Moreover, the same sequence as the existing DMRS sequence may be used for the sequence to add DMRS. In this case, base station 100 can perform coherent combining for the added DMRS in addition to channel estimation and coherent combining over multiple subframes, so that the channel estimation accuracy can be improved.

Furthermore, in Embodiment 1, DMRS is added only to terminal 200 configured with the large coverage enhancement level, and no DMRS is added to terminal 200 configured with the middle or small coverage enhancement level.

In this configuration, the DMRS increase improves the channel estimation accuracy and thus can improve the PUSCH transmission quality in terminal 200 configured with the large coverage enhancement level.

Moreover, no DMRS is added for terminal 200 configured with the middle or small coverage enhancement level, so that there is no decrease in the number of data bits for PUSCH data. In other words, degradation in the data transmission quality due to an increase in the number of DMRSs does not occur. Moreover, as described above, the PUSCH transmission quality can be improved by multiple subframe channel estimation and symbol level combining without any increase in the number of DMRSs in terminal 200 configured with the middle or small coverage enhancement level (see FIG. 4A).

As described above, according to Embodiment 1, the channel estimation accuracy in base station 100 can be improved without degradation of the transmission quality in PUSCH.

[Method of Mapping DMRS to be Added]

Hereinafter, a description will be given of reasons for additionally mapping a DMRS in the first, fifth, eighth or twelfth SC-FDMA symbol when the number of DMRSs is increased as illustrated in FIG. 10B or 10C.

Figure 11:
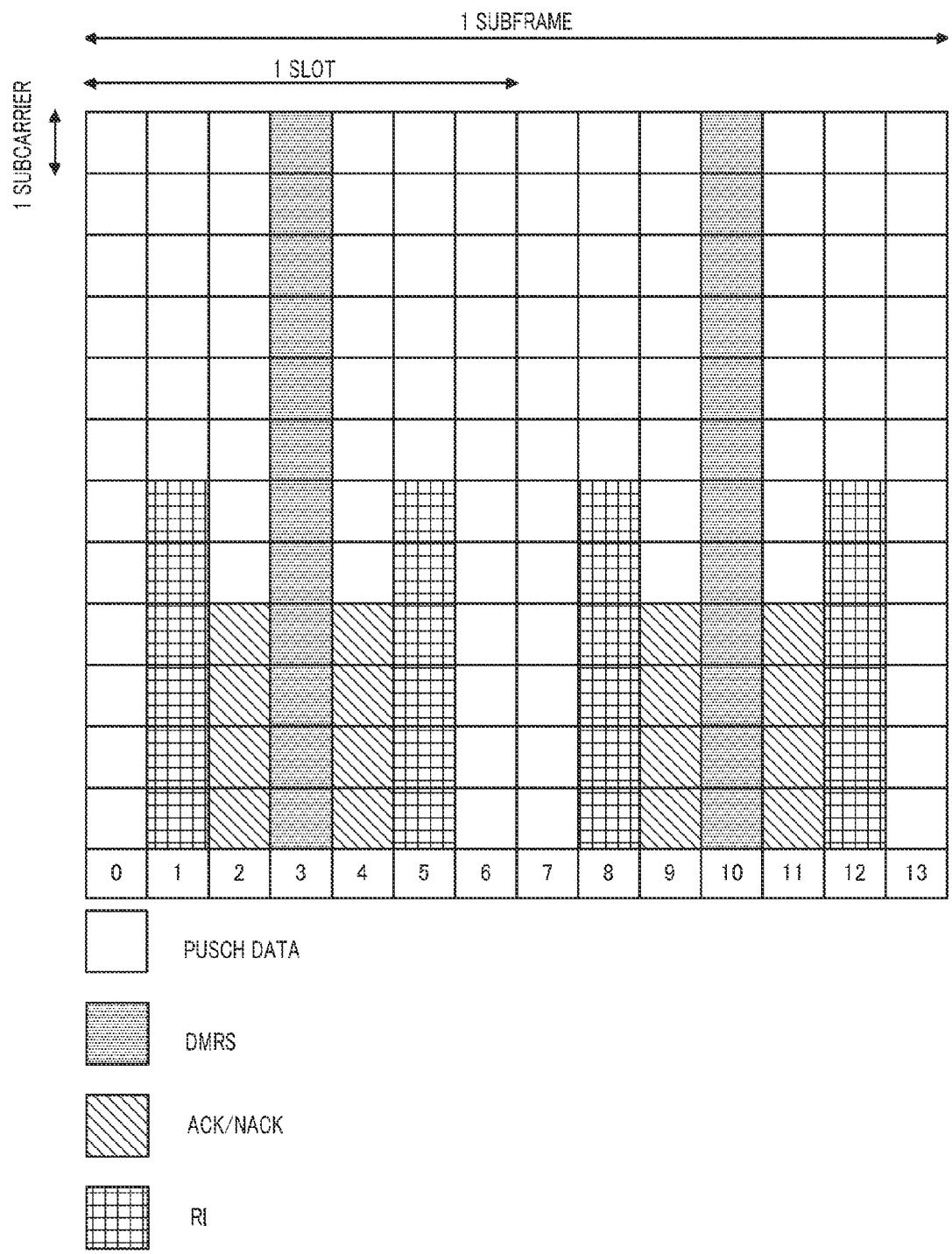
FIG. 11 is a diagram illustrating an example of signal mapping in a PUSCH subframe.

When uplink control information is multiplexed in PUSCH, as illustrated in FIG. 11, a response signal (ACK/NACK) for a downlink data signal is multiplexed on SC-FDMA symbols adjacent to SC-FDMA symbols where DMRSs are mapped (the third and tenth SC-FDMA symbols) (i.e., the second, fourth, ninth, and eleventh SC-FDMA symbols). Moreover, a Rank Indicator (RI) indicating a rank (number of layers) for Multiple-Input Multiple-Output (MIMO) multiplexing for downlink data is multiplexed on SC-FDMA symbols adjacent to the SC-FDMA symbols where an ACK/NACK is mapped (i.e., the first, fifth, eighth and twelfth SC-FDMA symbols).

The MTC coverage enhancement is expected to be used in an environment where the received power of a desired signal transmitted from terminal 200 to base station 100 and/or base station 100 to terminal 200 is very small. For this reason, the MTC coverage enhancement mode does not aim to increase the communication capacity using MIMO, so that it is expected that no MIMO multiplexing is used in the MTC coverage enhancement mode. In other words, RI indicating a rank (number of layers) for MIMO multiplexing is always one, so that there is no need for terminal 200 to feedback the case where RI>1.

In this respect, the additional DMRS may be mapped to a symbol where RI is mapped in Embodiment 1. For example, as illustrated in FIG. 10B or 10C, when the DMRSs to be added are mapped to the first, fifth, eighth or twelfth SC-FDMA symbol, among 12 resource elements (REs) forming each SC-FDMA symbol, the RI not used in the MTC coverage enhancement mode is replaced with DMRS in 6 REs. Thus, the number of resources for PUSCH data to be replaced with DMRS is only the remaining 6 REs.

As described above, mapping the DMRSs to be added to the first, fifth, eighth and twelfth SC-FDMA symbols which have been used for RI transmission can suppress a decrease in the number of data bits for PUSCH data due to addition of DMRS. In other words, the influence on PUSCH data can be minimized.

Moreover, as illustrated in FIG. 10B or 10C, mapping the DMRSs to be added to the first, fifth, eighth and twelfth SC-FDMA symbols results in mapping the DMRSs to the symbols on both sides of each SC-FDMA symbol where ACK/NACK is mapped, so that the transmission quality of ACK/NACK can be kept high.

[Method of Configuring DMRS Increase and DMRS Mapping]

Next, a description will be given of a method of configuring DMRS increase and DMRS mapping. The following three options are considered as the method of configuring DMRS increase and DMRS mapping.

(Option 1: RRC Signaling)

In Option 1, base station 100 indicates in advance a PUSCH coverage enhancement level (large, middle, small, or no coverage enhancement) or the number of repetitions ($N_{Rep}$) to terminal 200 via RRC signaling.

Terminal 200 determines whether or not to increase the number of DMRSs based on the coverage enhancement level or the number of repetitions indicated by base station 100. More specifically, terminal 200 increases the number of DMRSs when the large coverage enhancement level or the number of repetitions corresponding to this level (e.g., 128 times) is indicated by base station 100.

Moreover, when a candidate for the number of symbols used for addition of DMRS is configurable, terminal 200 may determine the number of symbols used for DMRS based on the coverage enhancement level or the number of repetitions indicated by base station 100. Alternatively, base station 100 may indicate the position of an SC-FDMA symbol for DMRS increase to terminal 200 via RRC signaling.

(Option 2: L1 Signaling)

In Option 2, base station 100 indicates in advance a PUSCH coverage enhancement level (large, middle, small, or no coverage enhancement) or the number of repetitions ($N_{Rep}$) to terminal 200 via a downlink control channel for MTC.

Terminal 200 determines whether or not to increase the number of DMRSs based on the coverage enhancement level or the number of repetitions indicated by base station 100. More specifically, terminal 200 increases the number of DMRSs when the large coverage enhancement level or the number of repetitions corresponding to this level (e.g., 128 times) is indicated by base station 100.

Moreover, when a candidate for the number of symbols used for addition of DMRS is configurable, terminal 200 may determine the number of symbols used for DMRS based on the coverage enhancement level or the number of repetitions indicated by base station 100. Alternatively, base station 100 may indicate in advance the position of an SC-FDMA symbol for DMRS increase to terminal 200 via RRC signaling.

(Option 3: Implicit Signaling)

In Option 3, base station 100 does not explicitly indicate the number of repetitions ($N_{Rep}$) to terminal 200. Base station 100 indicates only the MCS to terminal 200 via a downlink control channel for MTC.

When the number of repetitions can be expressed by using the coding rate in the reception transmission, terminal 200 can obtain the coding rate and the number of repetitions in the repetition transmission from the MCS indicated by base station 100. In this case, terminal 200 determines whether or not to increase the number of DMRSs based on the obtained number of repetitions. More specifically, terminal 200 increases the number of DMRSs when the number of repetitions corresponds to the large coverage enhancement level (e.g., 128 times).

Moreover, when a candidate for the number of symbols used for addition of DMRS is configurable, terminal 200 may determine the number of symbols used for DMRS based on the obtained number of repetitions. Alternatively, base station 100 may indicate in advance the position of an SC-FDMA symbol for DMRS increase to terminal 200 via RRC signaling.

Variation 1 of Embodiment 1

Figure 12B:
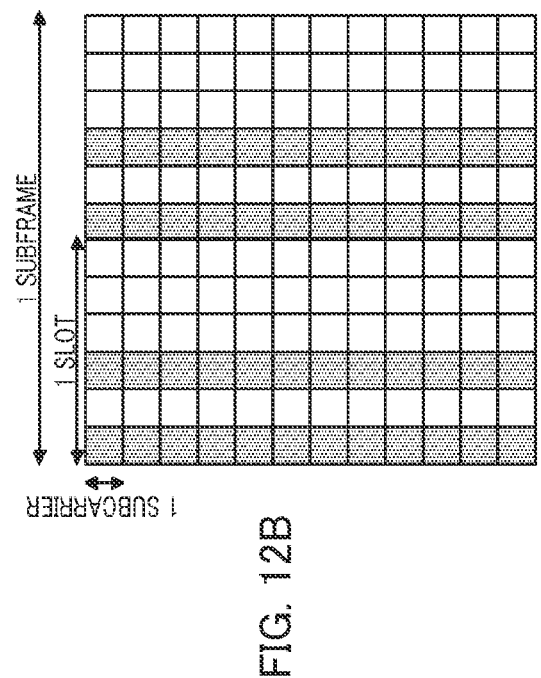
FIG. 12B is a diagram illustrating an example of DMRS mapping when the number of DMRSs is increased in Variation 1 of Embodiment 1.
Figure 12C:
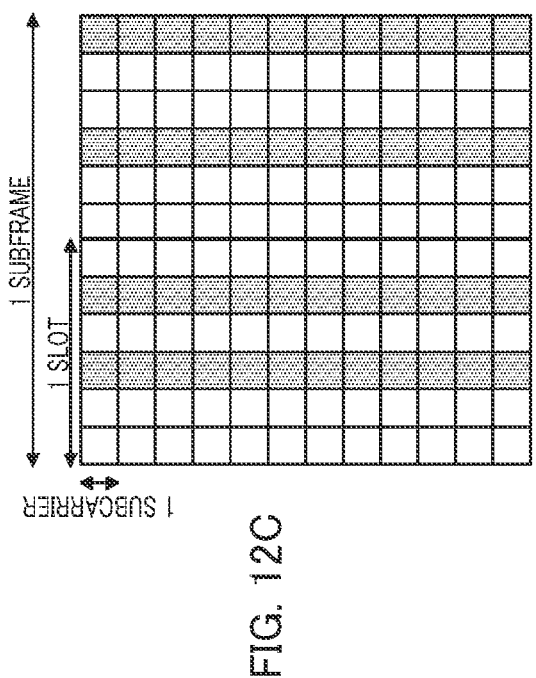
FIG. 12C is a diagram illustrating an example of DMRS mapping when the number of DMRSs is increased in Variation 1 of Embodiment 1.
Figure 12A:
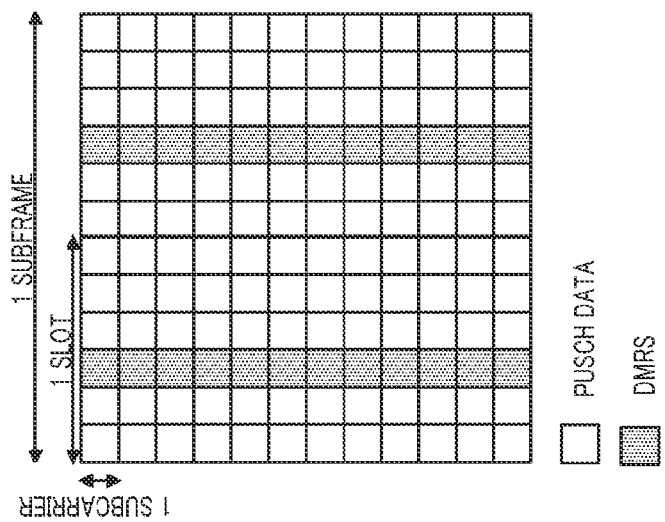
FIG. 12A is a diagram illustrating an example of DMRS mapping in an extended CP mode.

The MTC coverage enhancement is expected to be used also in an environment where terminal 200 is very distant from base station 100, so that the MTC coverage enhancement may be used in an environment where an extended CP mode is used. FIG. 12A illustrates a mapping example of the existing DMRSs in an environment where an extended CP mode is used. Meanwhile, FIGS. 12B and 12C each indicate a DMRS mapping example when the number of DMRSs illustrated in FIG. 12A is doubled as in the case of Embodiment 1. Thus, even in an environment where an extended CP mode is used, the DMRS increase can improve the PUSCH transmission quality in terminal 200 configured with the large coverage enhancement level.

Variation 2 of Embodiment 1

Figure 13:
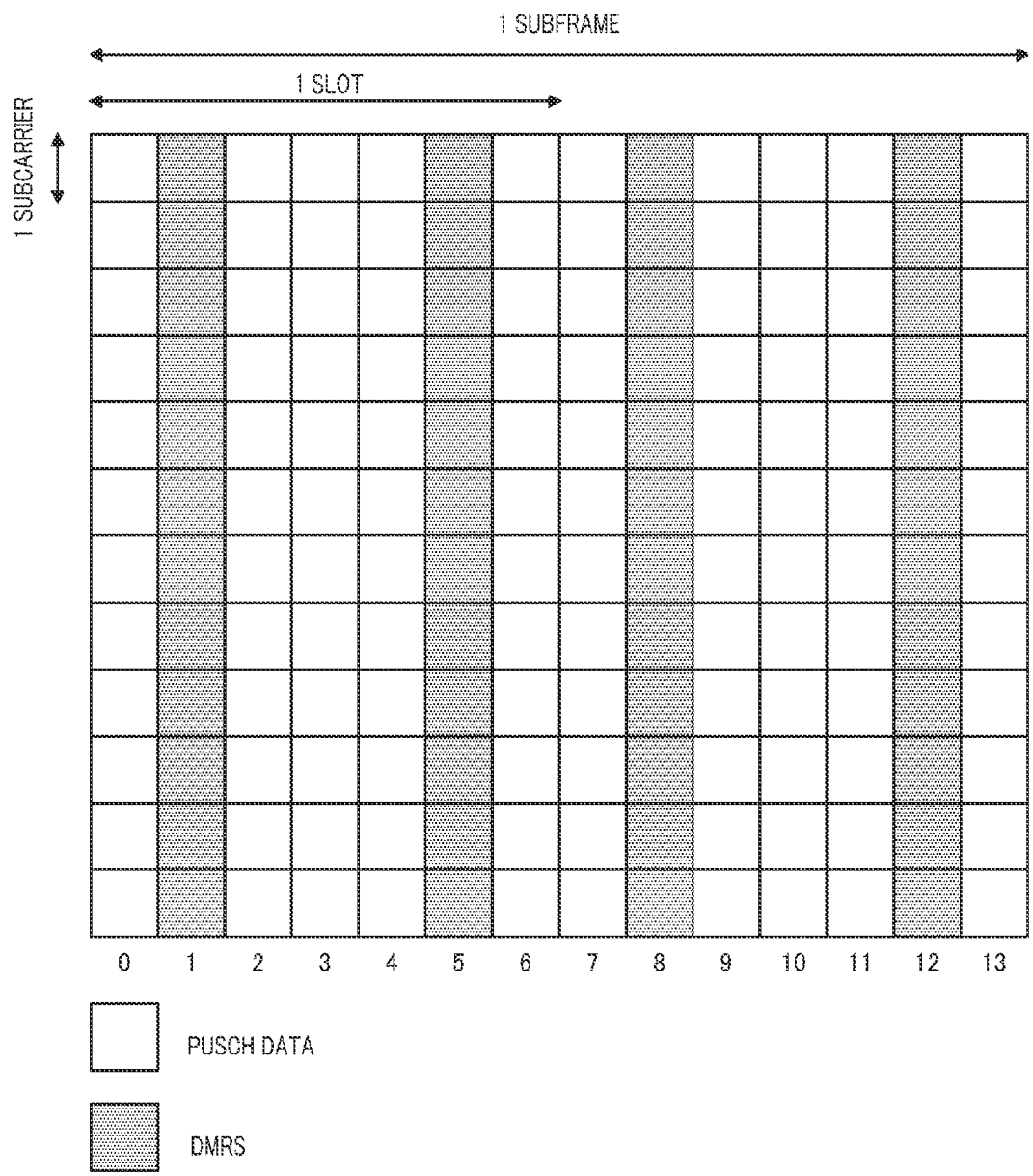
FIG. 13 is a diagram illustrating an example of DMRS mapping when the number of DMRSs is increased in Variation 2 of Embodiment 1.

As a variation of the case where the number of DMRSs is increased on a per-symbol basis, DMRSs may be mapped in accordance with a subframe configuration (DMRS mapping pattern) defined by existing PUCCH (Physical Uplink Control Channel) format 2 as illustrated in FIG. 13. In this case, there is an advantage in that there is no need to specify a new subframe format and the existing standard can be diverted even when the number of DMRSs is increased.

Embodiment 2

In Embodiment 1, the case where the added DMRSs are mapped on a per-symbol basis has been described. Meanwhile, in Embodiment 2, a case where the added DMRSs are mapped on a per-resource element (RE) basis will be described.

Note that, the base station and terminal according to Embodiment 2 will be described with reference to FIGS. 8 and 9 because their basic configurations are common to the configurations of base station 100 and terminal 200 according to Embodiment 1, respectively.

Base station 100 indicates the coverage enhancement level (large, middle, small, or no coverage enhancement) or the number of repetitions ($N_{Rep}$) to terminal 200 before PUSCH transmission and reception.

For example, the large coverage enhancement level (15 dB, 18 dB) and the number of repetitions ($N_{Rep}$)=128 may be associated with each other, while the middle coverage enhancement level (10 dB, 12 dB) and the number of repetitions ($N_{Rep}$)=16 may be associated with each other, and the small coverage enhancement level (5 dB, 6 dB) and the number of repetitions ($N_{Rep}$)=4 may be associated with each other.

As in Embodiment 1, when the coverage enhancement mode (repetition transmission) is applied to terminal 200 and the coverage enhancement level is smaller than a determined value (e.g., 15 dB or 18 dB), base station 100 and terminal 200 configure the number of DMRSs configured for the normal terminal (predefined number of DMRSs). In other words, base station 100 (control section 101) and terminal 200 (control section 206) do not increase the number of DMRSs mapped to PUSCH, when the coverage enhancement level or the number of repetitions ($N_{Rep}$) configured for terminal 200 is the middle or small coverage enhancement level or the number of repetitions corresponding to any one of these levels (e.g., 16 times or 8 times).

In this case, as illustrated in FIG. 10A, DMRS is mapped to one symbol of each slot (third and tenth SC-FDMA symbols) in one subframe, for example.

Meanwhile, as in Embodiment 1, when the coverage enhancement mode (repetition transmission) is applied to terminal 200 and the coverage enhancement level is equal to or larger than a determined value (e.g., 15 dB or 18 dB), base station 100 and terminal 200 configure the number of DMRSs obtained by adding a predetermined number of DMRSs to the number of DMRSs configured for the normal terminal (i.e., predefined number of DMRSs). In other words, base station 100 (control section 101) and terminal 200 (control section 206) increase the number of DMRSs mapped to PUSCH, when the coverage enhancement level or the number of repetitions ($N_{Rep}$) configured for terminal 200 is the large coverage enhancement level or the number of repetitions corresponding to this level (e.g., 128 times).

In Embodiment 2, the DMRS to be added is mapped on a per-RE basis in one subframe.

Figure 14:
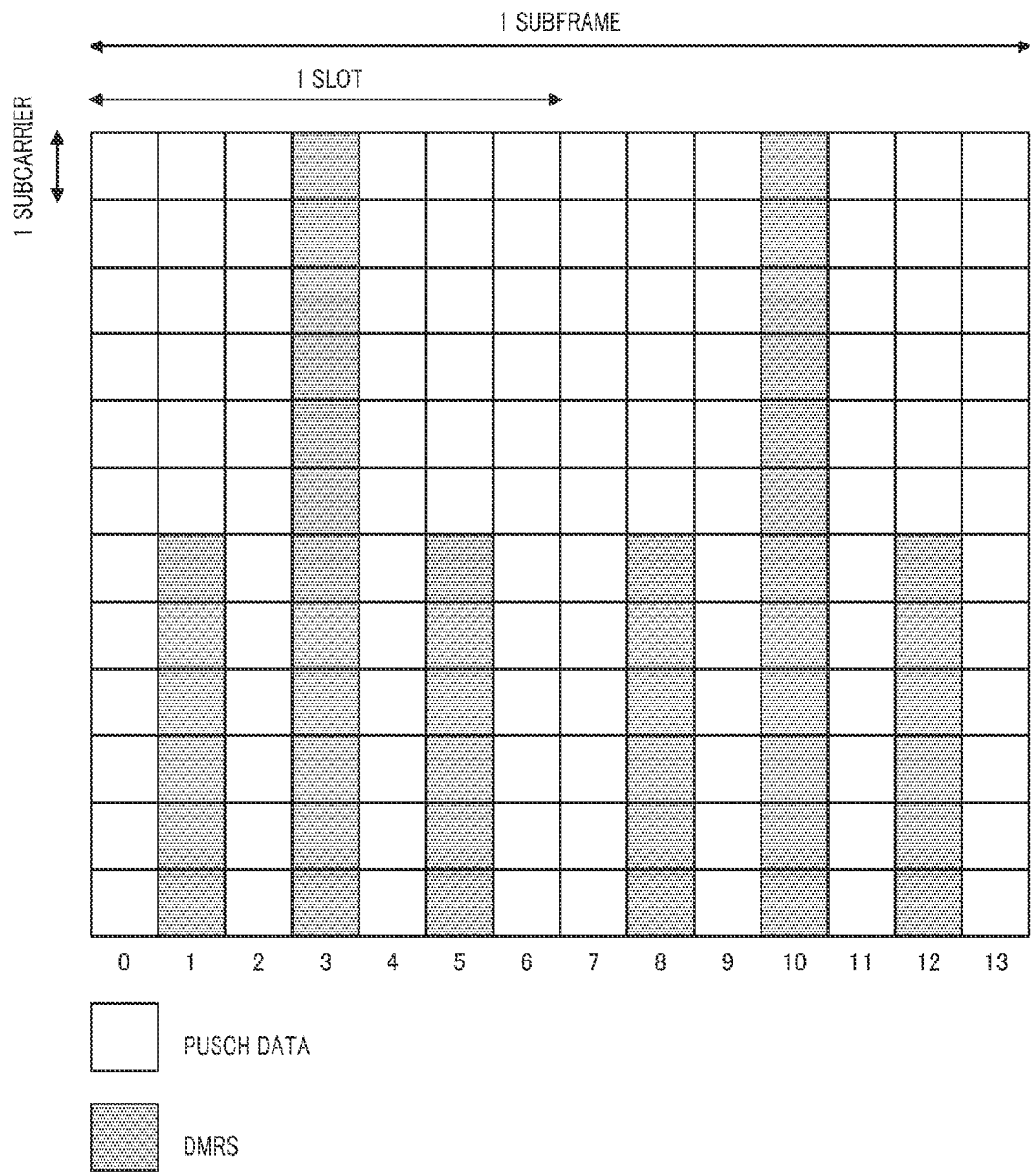
FIG. 14 is a diagram illustrating an example of DMRS mapping when the number of DMRSs is increased in Embodiment 2.

In FIG. 14, for example, in addition to the existing DMRS mapped to one symbol of each slot (third and tenth SC-FDMA symbols) in one subframe, DMRSs are added to 6 REs in each of the first, fifth, eighth and twelfth SC-FDMA symbols. In other words, the DMRSs to be added are mapped to 24 REs (the same number of REs as that for two symbols), respectively, in FIG. 14.

Note that, when the number of DMRSs is added, how DMRSs are mapped is by no means limited to the mapping example illustrated in FIG. 14, and the number of DMRSs may be increased on a per-RE basis in one subframe.

The granularity of DMRS increase by adding a DMRS on a per-RE basis is 0.6% ($\approx 1/(14*12)$). In other words, the overhead for DMRS increases by 0.6% when a DMRS is increased for one RE in one subframe.

As in Embodiment 2, adding a DMRS on a per-RE basis allows smaller granularity in terms of the ratio of DMRSs to data in a subframe compared with the case where DMRSs are added on a per-symbol basis as in Embodiment 1.

Moreover, a known QPSK symbol pattern may be used between base station 100 and terminal 200 as a DMRS sequence to be added. In this case, base station 100 can perform coherent combining for the added DMRS in addition to channel estimation and coherent combining over multiple subframes, so that the channel estimation accuracy can be improved.

Furthermore, as in Embodiment 1, DMRS is added only for terminal 200 configured with the large coverage enhancement level, while no DMRS is added for terminal 200 configured with the middle or small coverage enhancement level. Thus, the DMRS increase improves the channel estimation accuracy and thus can improve the PUSCH transmission quality in terminal 200 configured with the large coverage enhancement level. Moreover, since no DMRS is added to terminal 200 configured with the middle or small coverage enhancement level, there is no reduction in the number of data bits for PUSCH data. Meanwhile, as described above, in terminal 200 configured with the middle or small coverage enhancement level, the PUSCH transmission quality can be improved by multiple subframe channel estimation and symbol level combining without any increase in the number of DMRSs (see FIG. 4A).

As described above, according to Embodiment 2, the channel estimation accuracy in base station 100 can be improved without degradation of the transmission quality in PUSCH as in Embodiment 1.

Moreover, as described in Embodiment 1, it is expected that no MIMO multiplexing is used in the MTC coverage enhancement. Thus, RI indicating a rank (number of layers) for MIMO multiplexing is always one, so that there is no need for terminal 200 to feedback the case where RI>1.

In this respect, in Embodiment 2, the added DMRS may be mapped to an RE where an RI is mapped. For example, as illustrated in FIG. 14, when the DMRSs to be added are mapped to six REs of each of the first, fifth, eighth, and twelfth SC-FDMA symbols (e.g., see FIG. 11), the influence of adding DMRSs on PUSCH data is small compared with Embodiment 1. More specifically, although the number of REs to which the added DMRSs are mapped (24REs) in FIG. 14 is the same as that in Embodiment 1 (see FIGS. 10B and 10C), no resources for PUSCH data are replaced by the added DMRSs in FIG. 14. In other words, DMRSs can be added without any decrease in the number of data bits for PUSCH data in FIG. 14.

In addition, as in Embodiment 1, mapping additional DMRSs to the first, fifth, eighth and twelfth SC-FDMA symbols results in mapping DMRSs to the symbols on both sides of the SC-FDMA symbols where ACK/NACK is mapped, so that the transmission quality of ACK/NACK can be kept high.

[Method of Configuring DMRS Increase and DMRS Mapping]

Next, a description will be given of a method of configuring DMRS increase and DMRS mapping. The following three options are considered as the method of configuring DMRS increase and DMRS mapping.

(Option 1: RRC Signaling)

In Option 1, base station 100 indicates in advance a PUSCH coverage enhancement level (large, middle, small, or no coverage enhancement) or the number of repetitions ($N_{Rep}$) to terminal 200 via RRC signaling.

Terminal 200 determines whether or not to increase the number of DMRSs based on the coverage enhancement level or the number of repetitions indicated by base station 100. More specifically, terminal 200 increases the number of DMRSs when the large coverage enhancement level or the number of repetitions corresponding to this level (e.g., 128 times) is indicated by base station 100.

Moreover, when a candidate for the number of REs used for addition of DMRS is configurable, terminal 200 determines the number of REs used for DMRS based on the coverage enhancement level or the number of repetitions indicated by base station 100. Alternatively, base station 100 may indicate the position of an RE for DMRS increase or a DMRS sequence pattern to terminal 200 via RRC signaling.

(Option 2: L1 Signaling)

In Option 2, base station 100 indicates in advance a PUSCH coverage enhancement level (large, middle, small, or no coverage enhancement) or the number of repetitions ($N_{Rep}$) to terminal 200 via a downlink control channel for MTC.

Terminal 200 determines whether or not to increase the number of DMRSs based on the coverage enhancement level or the number of repetitions indicated by base station 100. More specifically, terminal 200 increases the number of DMRSs when the large coverage enhancement level or the number of repetitions corresponding to this level (e.g., 128 times) is indicated by base station 100.

Moreover, when a candidate for the number of REs used for addition of DMRS is configurable, terminal 200 determines the number of REs used for DMRS based on the coverage enhancement level or the number of repetitions indicated by base station 100. Alternatively, base station 100 may indicate the position of an RE for DMRS increase or a DMRS sequence pattern to terminal 200 via a downlink control channel for MTC or RRC signaling in advance.

(Option 3: Implicit Signaling)

In Option 3, base station 100 does not explicitly indicate the number of repetitions ($N_{Rep}$) to terminal 200. Base station 100 indicates only the MCS to terminal 200 via a downlink control channel for MTC.

When the number of repetitions can be expressed by using the coding rate in the reception transmission, terminal 200 can obtain the coding rate and the number of repetitions from the MCS indicated by base station 100. In this case, terminal 200 determines whether or not to increase the number of DMRSs based on the obtained number of repetitions. More specifically, terminal 200 increases the number of DMRSs when the number of repetitions corresponds to the large coverage enhancement level (e.g., 128 times).

Moreover, when a candidate for the number of REs used for addition of DMRS is configurable, terminal 200 determines the number of REs used for DMRS based on the obtained number of repetitions. Alternatively, base station 100 may in advance indicate the position of an RE for DMRS increase or a DMRS sequence pattern to terminal 200 via RRC signaling.

Embodiment 3

In Embodiment 3, a description will be given of a case where a sounding reference signal (SRS) transmitted from a terminal to a base station for measuring the uplink channel quality is used as additional DMRS.

Figure 15:
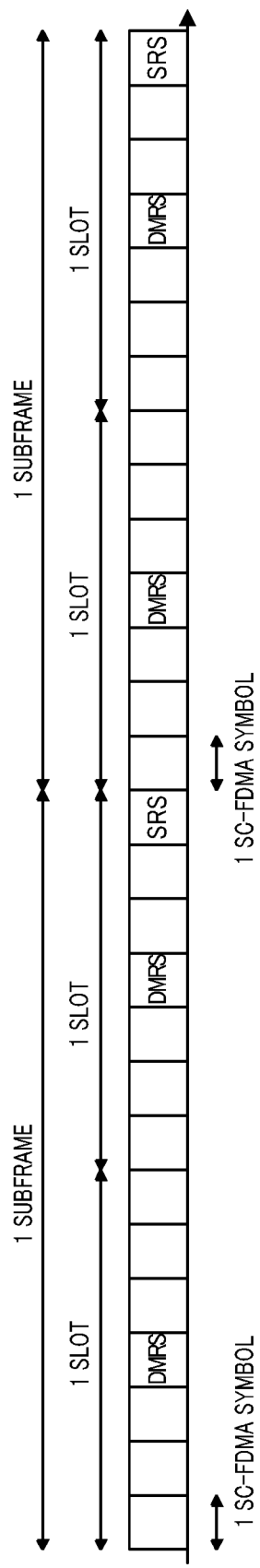
FIG. 15 is a diagram illustrating an example of DMRS and SRS mapping.

As illustrated in FIG. 15, it is specified that an SRS is multiplexed in the last symbol of a subframe and periodically transmitted from terminal 200 to base station 100. FIG. 15 illustrates an example in which one SRS is transmitted per subframe. Normally, base station 100 performs scheduling for terminal 200 to transmit a PUSCH signal based on the result of channel quality measurement using an SRS.

Note that, the base station and terminal according to Embodiment 3 will be described with reference to FIGS. 8 and 9 because their basic configurations are common to the configurations of base station 100 and terminal 200 according to Embodiment 1, respectively.

In Embodiment 3, base station 100 (control section 101) and terminal 200 (control section 206) increase the number of DMRSs to be mapped to PUSCH, when the coverage enhancement level or the number of repetitions ($N_{Rep}$) configured in terminal 200 is the large coverage enhancement level or the number of repetitions corresponding to this level (e.g., 128 times) as in Embodiment 1.

In this case, base station 100 performs channel estimation using an SRS in addition to the DMRSs transmitted from terminal 200. More specifically, in base station 100 according to Embodiment 3, for terminal 200 configured with the MTC coverage enhancement mode, demapping section 114 separates the extracted PUSCH subframe for terminal 200 into an SRS, DMRSs, and data symbols in a subframe in which an SRS is transmitted, and outputs the DMRSs and SRS to channel estimation section 115 and outputs the data symbols to equalizing section 116. Channel estimation section 115 performs channel estimation using the DMRSs and SRS received from demapping section 114.

As described above, in base station 100, performing channel estimation using an SRS as a demodulation reference signal for data symbols in addition to DMRSs can improve the channel estimation accuracy.

Accordingly, in Embodiment 3, the number of demodulation reference signals for data symbols can be increased without newly adding a DMRS, unlike Embodiment 1 or 2. Thus, the channel estimation accuracy can be improved without changing the coding rate for PUSCH data.

Note that, as illustrated in FIG. 15, an SRS is allowed to be transmitted via only one symbol per subframe, so that the channel estimation improvement when one SRS is transmitted per subframe is equivalent to the case where the number of DMRSs is increased one and a half times in Embodiment 1 or 2.

Variation of Embodiment 3

The channel estimation accuracy in base station 100 depends on the SRS transmission period. For example, when the SRS transmission period is every two subframes, only DMRSs for two symbols are present in one subframe in which no SRS is transmitted, as in the conventional case. For this reason, the channel estimation accuracy degrades compared with the case where one SRS is transmitted every subframe.

Figure 16A:
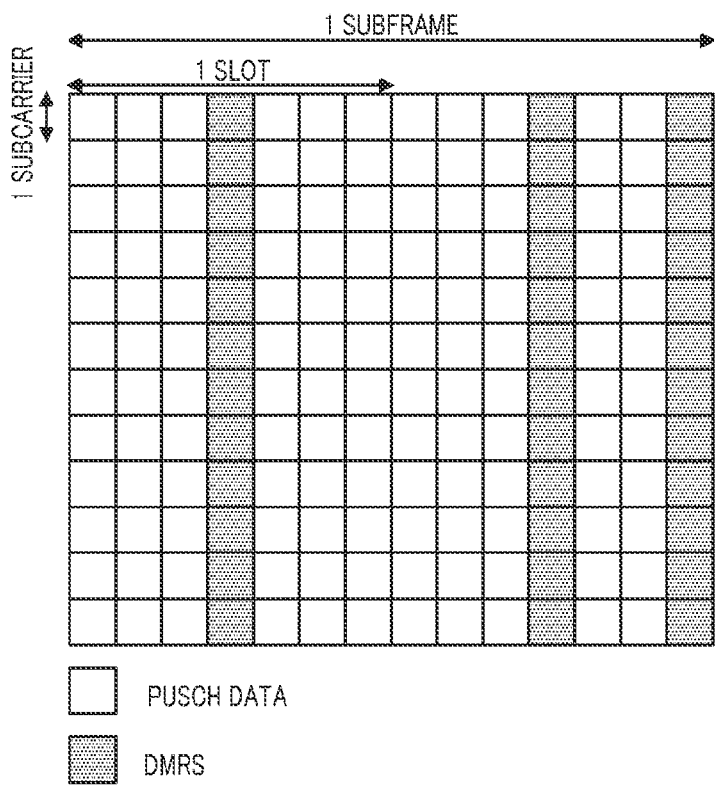
FIG. 16A is a diagram illustrating an example of DMRS mapping when the number of DMRSs is increased in a variation of Embodiment 3.
Figure 16B:
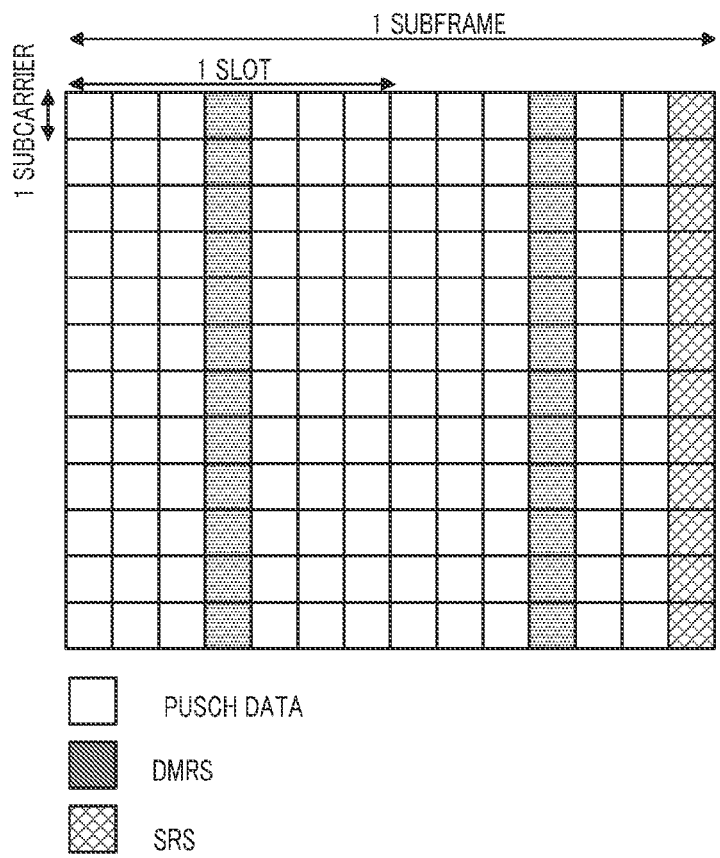
FIG. 16B is a diagram illustrating an example of signal mapping in a subframe in which SRS is transmitted in a variation of Embodiment 3.

In this respect, in order to solve the problem that the above channel estimation accuracy is dependent on the SRS transmission period, a DMRS is added to the last symbol as illustrated in FIG. 16A in a subframe in which no SRS is transmitted, while no DMRS is added in a subframe in which an SRS is transmitted as illustrated in FIG. 16B.

In this case, control section 206 instructs DMRS generating section 207 to add and transmit a DMRS in a subframe in which no SRS is transmitted.

DMRS generating section 207 generates a DMRS in accordance with the determination whether or not to increase the number of DMRSs, the number of DMRSs to be increased, and the position of a DMRS (subframe, and a symbol position in the subframe) that are indicated by control section 206 and outputs the generated DMRS to multiplexing section 210.

Meanwhile, when a DMRS is added to terminal 200, channel estimation section 115 in base station 100 performs channel estimation using the existing DMRSs (predefined number of DMRSs) and the SRS in a subframe configured to transmit an SRS. Meanwhile, channel estimation section 115 performs, in a subframe configured to transmit no SRS, channel estimation using the existing DMRSs and the DMRS added to the position (last symbol) of a subframe where an SRS is supposed to be mapped in a subframe in which an SRS is mapped.

As described above, using an SRS for channel estimation when a DMRS is added can minimize the influence on the data symbol caused by the addition of DMRS and also improve the channel estimation accuracy without dependency on the SRS transmission period.

[Method of Configuring DMRS Increase and DMRS Mapping]

Next, a description will be given of a method of configuring DMRS increase and DMRS mapping in the variation of Embodiment 3. The following three options are considered as the method of configuring DMRS increase and DMRS mapping as in Embodiment 1.

(Option 1: RRC Signaling)

In Option 1, base station 100 indicates in advance a PUSCH coverage enhancement level (large, middle, small, or no coverage enhancement) or the number of repetitions ($N_{Rep}$) to terminal 200 via RRC signaling.

Terminal 200 determines whether or not to increase the number of DMRSs based on the coverage enhancement level or the number of repetitions indicated by base station 100. More specifically, terminal 200 adds a DMRS to the last symbol of a subframe configured to transmit no SRS, when the large coverage enhancement level or the number of repetitions corresponding to this level (e.g., 128 times) is indicated by base station 100.

(Option 2: L1 Signaling)

In Option 2, base station 100 indicates in advance a PUSCH coverage enhancement level (large, middle, small, or no coverage enhancement) or the number of repetitions ($N_{Rep}$) to terminal 200 via a downlink control channel for MTC.

Terminal 200 determines whether or not to increase the number of DMRSs based on the coverage enhancement level or the number of repetitions indicated by base station 100. More specifically, terminal 200 adds a DMRS to the last symbol of a subframe configured to transmit no SRS, when the large coverage enhancement level or the number of repetitions corresponding to this level (e.g., 128 times) is indicated by base station 100.

(Option 3: Implicit Signaling)

In Option 3, base station 100 does not explicitly indicate the number of repetitions ($N_{Rep}$) to terminal 200. Base station 100 indicates only the MCS to terminal 200 via a downlink control channel for MTC.

When the number of repetitions can be expressed by using the coding rate in the reception transmission, terminal 200 can obtain the coding rate and the number of repetitions from the MCS indicated by base station 100. In this case, terminal 200 determines whether or not to increase the number of DMRSs based on the obtained number of repetitions. More specifically, terminal 200 adds a DMRS to the last symbol of a subframe configured to transmit no SRS, when the number of repetitions corresponds to the large coverage enhancement level (e.g., 128 times).

Each embodiment of this disclosure has been described thus far.

Note that, the values used for the number of repetitions, MTC coverage enhancement level, and the number of DMRSs mapped in a subframe are only examples, and are by no means limited to these examples. In addition, the positions where the added DMRSs are mapped in each of the embodiments are only examples and are by no means limited to these examples.

Note that, although each embodiment has been described with an example in which one mode of this disclosure is implemented by a hardware configuration by way of example, this disclosure can be also implemented by software in concert with hardware.

In addition, the functional blocks used in the description of each embodiment are typically implemented as LSI devices, which are integrated circuits. Such integrated circuits may control the functional blocks used in the description of the embodiments and be provided with inputs and outputs. The functional blocks may be formed as individual chips, or some or all of the functional blocks may be collectively made into a single chip. In addition, although the term "LSI" is used herein, the terms "IC," "system LSI," "super LSI" or "ultra LSI" may be used as well depending on the level of integration.

The circuit integration is not limited to LSI and may be implemented by a dedicated circuit or a general-purpose processor other than LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks may be integrated using such a technology. Another possibility is the application of biotechnology, for example.

A base station of the present disclosure includes: a control section that configures a first number of demodulation reference signals (DMRSs) for a terminal when a coverage enhancement level is smaller than a determined value, and that configures a second number of DMRSs for the terminal when the coverage enhancement level is equal to or larger than the determined value, the terminal being configured to perform repetition of an uplink signal over a plurality of subframes, the uplink signal being formed by time-multiplexing a data symbol with a DMRS in one subframe, the coverage enhancement level corresponding to a number of the plurality of subframes, the second number being larger than the first number; a receiving section that receives the uplink signal including the DMRSs and transmitted from the terminal; and a channel estimation section that performs channel estimation using the DMRS included in the received uplink signal.

In the base station of this disclosure, the second number of DMRSs is obtained by adding additional DMRSs to the first number of DMRSs.

In the base station of this disclosure, the second number of DMRSs is obtained by adding additional DMRS to the first number of DMRSs, and the additional DMRSs is mapped on a per-symbol basis in one subframe.

In the base station off this disclosure, the additional DMRS is mapped to a symbol to which a rank indicator (RI) is mapped.

In the base station of this disclosure, when the terminal is configured with the second number of DMRSs, the DMRSs are mapped in accordance with a DMRS mapping pattern defined by PUCCH (Physical Uplink Control Channel) format 2.

In the base station of this disclosure, the second number of DMRSs is obtained by adding additional DMRS to the first number of DMRSs, and the additional DMRS is mapped on a per-resource element basis in one subframe.

In the base station of this disclosure, the additional DMRS is mapped to a resource element to which a rank indicator (RI) is mapped.

In the base station of this disclosure, the second number of DMRSs is obtained by adding additional DMRS to the first number of DMRSs; and when the terminal is configured with the second number of DMRSs, the channel estimation section performs, in a first subframe in which a sounding reference signal (SRS) is transmitted, channel estimation using the first number of DMRSs and the SRS, and the channel estimation section performs, in a second subframe in which no SRS is transmitted, channel estimation using the first number of DMRSs and the additional DMRS that is mapped to a position of the second subframe where the SRS is mapped in the first subframe.

A terminal of this disclosure includes: a control section that configures a first number of demodulation reference signals (DMRSs) for the terminal when the terminal applies repetition over a plurality of subframes to an uplink signal and a coverage enhancement level corresponding to a number of the plurality of subframes is smaller than a determined value, and that configures a second number of DMRSs for the terminal when the terminal applies the repetition and the coverage enhancement level is equal to or larger than the determined value, the uplink signal being formed by time-multiplexing a data symbol with a DMRS in one subframe, the second number being larger than the first number; and a transmission section that transmits the uplink signal including the DMRSs.

A receiving method of this disclosure includes: configuring a first number of demodulation reference signals (DMRSs) for a terminal when a coverage enhancement level is smaller than a determined value, and configuring a second number of DMRSs for the terminal when the coverage enhancement level is equal to or larger than the determined value, the terminal being configured to perform repetition of an uplink signal over a plurality of subframes, the uplink signal being formed by time-multiplexing a data symbol with a DMRS in one subframe, the coverage enhancement level corresponding to a number of the plurality of subframes, the second number being larger than the first number; receiving the uplink signal including the DMRSs and transmitted from the terminal; and performing channel estimation using the DMRS included in the received uplink signal.

A transmission method of this disclosure includes: configuring a first number of demodulation reference signals (DMRSs) for a terminal when the terminal applies repetition over a plurality of subframes to an uplink signal and a coverage enhancement level corresponding to a number of the plurality of subframes is smaller than a determined value, and configuring a second number of DMRSs for the terminal when the terminal applies the repetition and the coverage enhancement level is equal to or larger than the determined value, the uplink signal being formed by time-multiplexing a data symbol with a DMRS in one subframe, the second number being larger than the first number; and transmitting the uplink signal including the DMRSs.

INDUSTRIAL APPLICABILITY

One aspect of this disclosure is useful in mobile communication systems.

REFERENCE SIGNS LIST

100 Base station
200 Terminal
101, 206 Control section
102 Control signal generating section
103, 208 Coding section
104, 209 Modulation section
105, 213 Mapping section
106, 214 IFFT section
107, 215 CP adding section
108, 216 Transmission section
109, 201 Antenna
110, 202 Receiving section
111, 203 CP removal section
112, 204 FFT section
113 Combining section
114 Demapping section
115 Channel estimation section
116 Equalizing section
117 Demodulation section
118 Decoding section
119 Determining section
205 Extraction section
207 DMRS generating section
210 Multiplexing section
211 DFT section
212 Repetition section

The invention claimed is:
1. A base station comprising:
a control section that configures a first or second number of demodulation reference signals (DMRSs) according to a coverage enhancement level for a terminal;
a receiving section that receives an uplink signal including a subframe repeated a plurality of times, the subframe including a data symbol and the DMRSs, from the terminal; and
a channel estimation section that performs channel estimation using the DMRSs included in the received uplink signal, wherein,
the first number of DMRSs is configured when the coverage enhancement level is a first coverage enhancement level or a second coverage enhancement level, the second coverage enhancement level being larger than the first coverage enhancement level, and the second number of DMRSs, which is larger than the first number of DMRSs, is configured when the coverage enhancement level is a third coverage enhancement level, the third coverage enhancement level being larger than the second coverage enhancement level,
a number of times for which the subframe is repeated in the received uplink signal when the coverage enhancement level is the second coverage enhancement level is larger than a number of times for which the subframe is repeated in the received uplink signal when the coverage enhancement level is the first coverage enhancement level,
a number of times for which the subframe is repeated in the received uplink signal when the coverage enhancement level is the third coverage enhancement level is larger than the number of times for which the subframe is repeated in the received uplink signal when the coverage enhancement level is the second coverage enhancement level, the second number of DMRSs is obtained by adding additional DMRS(s) to the first number of DMRSs, and when the second number of DMRSs is configured for the terminal, the channel estimation section performs, in a first subframe in which a sounding reference signal (SRS) is transmitted, channel estimation using the first number of DMRSs and the SRS, and the channel estimation section performs, in a second subframe in which no SRS is transmitted, channel estimation using the first number of DMRSs and the additional DMRS(s) that are mapped to a position of the second subframe where the SRS is mapped in the first subframe.

2. The base station according to claim 1, wherein the additional DMRS(s) are mapped on a per-symbol basis in one subframe.

3. The base station according to claim 2, wherein the additional DMRS(s) are mapped to a symbol to which a rank indicator (RI) is mapped.

4. The base station according to claim 1, wherein, when the terminal is configured with the second number of DMRSs, the DMRSs are mapped in accordance with a DMRS mapping pattern defined by PUCCH (Physical Uplink Control Channel) format 2.

5. The base station according to claim 1, wherein the additional DMRS(s) are mapped on a per-resource element basis in one subframe.

6. The base station according to claim 5, wherein the additional DMRS(s) are mapped to a resource element to which a rank indicator (RI) is mapped.

7. A terminal comprising:
a control section that configures a first or second number of demodulation reference signals (DMRSs) according to a coverage enhancement level for the terminal; and
a transmission section that transmits an uplink signal including a subframe repeated a plurality of times, the subframe including a data symbol and the DMRSs, wherein
the first number of DMRSs is configured when the coverage enhancement level is a first coverage enhancement level or a second coverage enhancement level, the second coverage enhancement level being larger than the first coverage enhancement level, and the second number of DMRSs, which is larger than the first number of DMRSs, is configured when the coverage enhancement level is a third coverage enhancement level, the third coverage enhancement level being larger than the second coverage enhancement level,
a number of times for which the subframe is repeated in the uplink signal when the coverage enhancement level is the second coverage enhancement level is larger than a number of times for which the subframe is repeated in the uplink signal when the coverage enhancement level is the first coverage enhancement level,
a number of times for which the subframe is repeated in the uplink signal when the coverage enhancement level is the third coverage enhancement level is larger than the number of times for which the subframe is repeated in the uplink signal when the coverage enhancement level is the second coverage enhancement level,
the second number of DMRSs is obtained by adding additional DMRS(s) to the first number of DMRSs, and when the second number of DMRSs is configured for the terminal, channel estimation, in a first subframe in which a sounding reference signal (SRS) is transmitted, is performed using the first number of DMRSs and the SRS, and channel estimation, in a second subframe in which no SRS is transmitted, is performed using the first number of DMRSs and the additional DMRS(s) that are mapped to a position of the second subframe where the SRS is mapped in the first subframe.

8. A receiving method comprising:
configuring a first or a second number of demodulation reference signals (DMRSs) according to a coverage enhancement level for a terminal;
receiving an uplink signal including a subframe repeated a plurality of times, the subframe including a data symbol and the DMRSs, from the terminal; and
performing channel estimation using the DMRSs included in the received uplink signal, wherein,
the first number of DMRSs is configured when the coverage enhancement level is a first coverage enhancement level or a second coverage enhancement level, the second coverage enhancement level being larger than the first coverage enhancement level, and the second number of DMRSs, which is larger than the first number of DMRSs, is configured when the coverage enhancement level is a third coverage enhancement level, the third coverage enhancement level being larger than the second coverage enhancement level,
a number of times for which the subframe is repeated in the received uplink signal when the coverage enhancement level is the second coverage enhancement level is larger than a number of times for which the subframe is repeated in the received uplink signal when the coverage enhancement level is the first coverage enhancement level,
a number of times for which the subframe is repeated in the received uplink signal when the coverage enhancement level is the third coverage enhancement level is larger than the number of times for which the subframe is repeated in the received uplink signal when the coverage enhancement level is the second coverage enhancement level,
the second number of DMRSs is obtained by adding additional DMRS(s) to the first number of DMRSs, and when the second number of DMRSs is configured for the terminal, channel estimation, in a first subframe in which a sounding reference signal (SRS) is transmitted, is performed using the first number of DMRSs and the SRS, and channel estimation, in a second subframe in which no SRS is transmitted, is performed using the first number of DMRSs and the additional DMRS(s) that are mapped to a position of the second subframe where the SRS is mapped in the first subframe.

9. A transmission method comprising:
configuring a first or second number of demodulation reference signals (DMRSs) according to a coverage enhancement level for a terminal; and
transmitting an uplink signal including a subframe repeated a plurality of times, the subframe including a data symbol and the DMRSs, wherein,
the first number of DMRSs is configured when the coverage enhancement level is a first coverage enhancement level or a second coverage enhancement level, the second coverage enhancement level being larger than the first coverage enhancement level, and the second number of DMRSs, which is larger than the first number of DMRSs, is configured when the coverage enhancement level is a third coverage enhancement level, the third coverage enhancement level being larger than the second coverage enhancement level, a number of times for which the subframe is repeated in the uplink signal when the coverage enhancement level is the second coverage enhancement level is larger than a number of times for which the subframe is repeated in the uplink signal when the coverage enhancement level is the first coverage enhancement level, a number of times for which the subframe is repeated in the uplink signal when the coverage enhancement level is the third coverage enhancement level is larger than the number of times for which the subframe is repeated in the uplink signal when the coverage enhancement level is the second coverage enhancement level, the second number of DMRSs is obtained by adding additional DMRS(s) to the first number of DMRSs, and when the second number of DMRSs is configured for the terminal, channel estimation, in a first subframe in which a sounding reference signal (SRS) is transmitted, is performed using the first number of DMRSs and the SRS, and channel estimation, in a second subframe in which no SRS is transmitted, is performed using the first number of DMRSs and the additional DMRS(s) that are mapped to a position of the second subframe where the SRS is mapped in the first subframe.

* * * * *